US008192013B2

(12) United States Patent  (10) Patent No.: US 8,192,013 B2
Morohoshi et al.                (45) Date of Patent:    Jun. 5, 2012

(54) INKJET RECORDING APPARATUS AND INKJET RECORDING METHOD

(75) Inventors: Naoya Morohoshi, Shizuoka (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/289,175

(22) Filed: Nov. 4, 2011

(65) Prior Publication Data

US 2012/0044293 A1    Feb. 23, 2012

Related U.S. Application Data

(60) Division of application No. 12/341,007, filed on Dec. 22, 2008, now Pat. No. 8,083,342, which is a division of application No. 11/019,227, filed on Dec. 23, 2004, now Pat. No. 7,490,930, which is a continuation of application No. PCT/JP03/07996, filed on Jun. 24, 2003.

(30) Foreign Application Priority Data

Jun. 24, 2002 (JP) ................. 2002-182906

(51) Int. Cl.
   *B41J 2/01* (2006.01)
(52) U.S. Cl. ............ 347/105; 347/101; 347/14; 347/100
(58) Field of Classification Search .................. 347/100, 347/95, 96, 101, 102, 103, 105, 43, 14; 106/31.6, 106/31.27, 31.13; 523/160, 161; 428/195, 428/32.1
See application file for complete search history.

(56) References Cited

U.S. PATENT DOCUMENTS

| 5,910,359 | A | 6/1999 | Kobayashi et al. |
| 5,992,971 | A * | 11/1999 | Takahashi et al. ............... 347/43 |
| 6,149,327 | A | 11/2000 | Ward et al. |
| 6,290,329 | B1 | 9/2001 | Terasawa et al. |
| 6,336,705 | B1 * | 1/2002 | Torigoe .......................... 347/100 |
| 6,705,702 | B2 * | 3/2004 | Gunther et al. ............... 347/100 |
| 6,809,836 | B1 | 10/2004 | Nobuta et al. |

(Continued)

FOREIGN PATENT DOCUMENTS

EP    0 650 840 A2    5/1995

(Continued)

OTHER PUBLICATIONS

Extended European Search Report issued Nov. 15, 2011, in Patent Application No. 10178242.3.

*Primary Examiner* — Manish S Shah
(74) *Attorney, Agent, or Firm* — Oblon, Spivak, McClelland, Maier & Neustadt, L.L.P.

(57)    ABSTRACT

An inkjet recording apparatus, includes: a black ink ejecting portion configured to eject a black ink containing a self-dispersion pigment; color ink ejecting portions configured to eject, respectively, a cyan ink, a magenta ink and a yellow ink which contain a polymer emulsion containing a polymer fine particle containing a coloring material which is insoluble in water or slightly soluble in water; and a recording-controlling unit configured to control recording. When the recording medium is optically transparent and is provided, on a transparent base material thereof, with an ink accepting layer, the recording-controlling unit controls recording on the recording medium such that the color ink ejecting portion is used for recording a monochrome image and a color image which has a plurality of colors, leaving the black ink ejecting portion substantially free from being used.

8 Claims, 8 Drawing Sheets

U.S. PATENT DOCUMENTS

| | | |
|---|---|---|
| 2002/0006982 A1* | 1/2002 | Kurabayashi ............... 523/161 |
| 2002/0038613 A1 | 4/2002 | Yatake |
| 2002/0077385 A1 | 6/2002 | Miyabayashi |
| 2003/0053104 A1 | 3/2003 | Morisaki et al. |
| 2003/0107632 A1 | 6/2003 | Arita et al. |

FOREIGN PATENT DOCUMENTS

| | | |
|---|---|---|
| EP | 0 650 840 A3 | 5/1995 |
| EP | 0 947 567 A1 | 10/1999 |
| EP | 1 125 994 A1 | 8/2001 |
| EP | 1 148 103 A1 | 10/2001 |
| JP | 05-186704 | 7/1993 |
| JP | 8-3498 | 1/1996 |
| JP | 9-109547 | 4/1997 |
| JP | 10-119417 | 5/1998 |
| JP | 10-140064 | 5/1998 |
| JP | 10-329405 | 12/1998 |
| JP | 11-198250 | 7/1999 |
| JP | 11-342669 | 12/1999 |
| JP | 2000-037495 | 2/2000 |
| JP | 2000-53598 | 2/2000 |
| JP | 2000-53897 | 2/2000 |
| JP | 2000-079752 | 3/2000 |
| JP | 2000-108508 | 4/2000 |
| JP | 2000-191972 | 7/2000 |
| JP | 2000-198227 | 7/2000 |
| JP | 2000-212486 | 8/2000 |
| JP | 2000-238420 | 9/2000 |
| JP | 2000-513396 | 10/2000 |
| JP | 2000-318298 | 11/2000 |
| JP | 2001-139849 | 5/2001 |
| JP | 2002-3767 | 1/2002 |
| WO | 97/48769 | 12/1997 |

* cited by examiner

INKJET RECORDING APPARATUS AND INKJET RECORDING METHOD

CROSS-REFERENCE TO RELATED APPLICATIONS

This is a divisional application of U.S. application Ser. No. 12/341,007, filed Dec. 22, 2008 now U.S. Pat. No. 8,083,342, which is a divisional application of U.S. application Ser. No. 11/019,227, filed Dec. 23, 2004, now U.S. Pat. No. 7,490,930, which is a continuation of Application No. PCT/JP03/07996, filed on Jun. 24, 2003.

BACKGROUND OF THE INVENTION

1. Field of the Invention

The present invention relates to an inkjet recording apparatus and an inkjet recording method which use a pigment ink. More specifically, the present invention relates to the inkjet recording apparatus and the inkjet recording method which can bring about a high quality image that is excellent in ink absorbing property and fixing property and has good color tone, can bring about an image that is excellent in image rigidity such as water-proof and light-proof, is excellent in storage stability and is excellent in ejection stability free from head's clogging in the printing.

2. Description of the Related Art

From its advantages such as low noise, low running cost and the like, an inkjet recording apparatus is remarkably pervaded, and a color printer capable of printing color image on plain paper in addition to an inkjet recording medium is more and more placed on the market. It is, however, very difficult to meet all required properties including color reproducibility of an image, durability, light resistance, image dryness, character feathering, color boundary bleeding (for short, color bleeding), both-side printing property, ejection stability, and the like. With this, the ink used is selected based on a preferential property for a specific application. Especially, meeting the above required properties are difficult for the printer for high-speed plain paper printing.

Generally, with its principle component of water, the ink for the inkjet printing contains a coloring agent, and further contains a wetting agent such as glycerin and the like for clogging prevention. As the coloring agent, dye is used in view of its excellent coloring property and stability. An image obtained by using a dye ink does not have good light resistance, waterproof, and the like. The waterproof is improved to a certain extent by improvement of inkjet record paper having an ink absorbing layer, which improvement does not, however, apply sufficiently to the plain paper.

Recently, for solving the above problems, a pigment ink using as coloring agent an organic pigment, carbon black and the like in place of the dye is taken into account. The pigment is insoluble in water. Thereby, the pigment can be used as an aqueous ink in which the pigment is mixed and dispersed with a dispersing agent for stable dispersion in water. Use of the pigment can bring about waterproof and light resistance, but cannot meet other properties at the same time. Especially, the high-speed printing of the plain paper cannot obtain high image density and high coloring property, failing to sufficiently meet the character feathering, the color bleeding, the both-side printing property and the like.

In the inkjet printing, a stable ejection of an ink droplet from a thin nozzle of an inkjet recording head is needed. For meeting the above, it is necessary that dryness of an orifice of the inkjet recording head does not cause solidification and the like of the ink. Use of a dispersing agent-contained ink for the inkjet printing may sometimes cause clogging or ink's ejection failure which may be attributable to a resin and the like (of the dispersing agent) that is not dissolved again after adhering to the orifice and the like. Especially, a long-time stoppage of the printing is likely to cause the clogging of the nozzle and the like, moreover, the long-time stoppage may cause ink's accumulation (the ink with increased viscosity) in a nozzle cap or in a maintenance mechanism such as intake-tube and the like, thus losing function of the maintenance mechanism. A temporary stoppage of printing, or a temporary stoppage of using a nozzle that corresponds to a blanked document or a blanked image may cause a printing failure and the like which may be attributable to disoriented direction of injection of ink droplet (intermittent ejection failure). The above problems occurred so often. An aqueous pigment ink containing the dispersing agent is viscous and causes a resistance in a path to a nozzle's head end in the long-time continuous ejection and a high-speed printing, thus making the ejection unstable and making it difficult to achieve a smooth printing.

For solving the above problems, the following inks are to be proposed.

Resin Dispersion Pigment Ink

For solving the above problems, Japanese Patent Application Laid-Open (JP-A) No. 2000-212486 discloses an ink having specific agents and property such as pigment, pigment density, water-soluble dispersing agent, and penetrating agent; an ink containing polyhydric alcohol alkylether derivatives; and an ink set thereof. The ink disclosed in JP-A No. 2000-212486 has a super permeability, and thereby has a sufficient dryness even at a high-sped printing and has a secured ejection stability. The ink disclosed in JP-A No. 2000-212486 is, however, inferior to a dye ink in terms of image density, color reproducibility and the like when the plain paper is used. Although more improved in character feathering, color bleeding and both-side printing property than a conventional inkjet record image, a record image disclosed in JP-A No. 2000-212486 is inferior to a record image of an electrophotographic method and the like used for plain paper printing on the market, thereby is in need of more improvement.

Ink Containing Coloring Agent-Encapsulated Resin Dispersion

For improving durability of the image, an ink is disclosed which contains a coloring agent-encapsulated resin dispersion which encapsulates a coloring agent in an insoluble-and-dispersing resin. However, the above ink does not obtain a sufficient image density when a carbon black is used as the coloring agent. A color organic pigment used as the coloring agent for a conventional ink is inferior to a dye ink in terms of image density, color reproducibility and the like on the plain paper. An ink set of the above coloring agent-encapsulated resin dispersion which set combines a black ink with a color ink cannot bring about a sufficient color boundary bleeding between black and yellow.

Self-Dispersion Pigment Ink

Other dispersing methods include a self-dispersion pigment ink which is capable of making a stable dispersion without a dispersing agent. In terms of a black pigment ink, JP-A No. 5-186704 and JP-A No. 8-3498 disclose so-called a self-dispersion carbon black which is capable of making a stable dispersion without a dispersing agent by introducing a hydrophilic group to a surface of carbon. Moreover, in terms of a color pigment ink, JP-A No. 2000-513396 discloses a color pigment which is capable of making a stable dispersion without a dispersing agent.

Combining the above self-dispersion pigment inks is low in terms of chroma of a color image on plain paper, and deteriorated in terms of friction resistance on a special recording medium such as gloss paper.

Alternatively, JP-A No. 10-140064 discloses an ink set comprising a black ink and a color ink in which a black ink having a self-dispersion carbon black and a color ink containing a coloring material whose polarity is opposite to that of a coloring material of the black ink. Furthermore, JP-A No. 2000-191972 discloses an ink set having coloring agent-encapsulated resin dispersion inks having different ionicities. A printed matter printed with the above ink sets are improved in terms of color bleeding, however, still failing to meet other properties of the plain paper.

On the other hand, efforts for improving fitness to the pigment ink have been made with a coat paper type inkjet recording medium which is provided with a coat layer on a base material. JP-A No. 11-342669 discloses the one having an ink accepting layer mainly composed of water-soluble resin. In JP-A No. 11-342669, an inkjet recording body contains hydroxy propyl methyl cellulose, moreover the ink accepting layer contains a single polymer resin (N-vinyl pyrrolidone) or a copolymer resin (N-vinyl pyrrolidone and other polymeric monomer). JP-A No. 2000-108508 discloses an inkjet record sheet containing methoxyl group-contained water-soluble cellulose derivative and water-soluble cationic resin. JP-A No. 10-329405 discloses an inkjet record sheet which contains hydrophilic high molecular resin and a specific anionic fluorine surfactant.

As those having the ink accepting layer mainly composed of an inorganic pigment and binder resin, JP-A No. 10-119417 discloses an inkjet record sheet provided with i) a base material sheet, ii) an ink permeation layer (mainly composed of inorganic filler) disposed on the base material sheet, and iii) an ink swelling layer mainly composed of water-soluble resin. JP-A No. 10-329417 discloses an inkjet recording film has a recording layer which is a sequential lamination of (A) an ink accepting layer containing water-soluble resin, coarse face forming agent, and cross-linking agent, and (B) a layer containing dot-shape regulating agent. In the above inkjet recording film, at least two types of synthetic silicas having different oil-absorbing amount are used as the coarse face forming agent. Varying the amount of use of these may adjust the number of samplings of the recording layer in a range of 20 to 100 and adjust an ink fixing period less than 5 minutes. JP-A No. 11-99739 discloses an inkjet record sheet having a first ink accepting layer and a second ink accepting layer, in which the first ink accepting layer contains a resin component which is dissolved in or swelled with a coating solution for the second ink accepting layer. The second ink accepting layer has pigment content more than that of the first ink accepting layer. JP-A No. 11-245502 discloses an inkjet coating agent which contains a hydrophilic polyurethane and a silica mixture, where the hydrophilic polyurethane is contained in a range of 15% by weight to 90% by weight relative to an entire coating agent, while the silica mixture (containing i. a silica having an average particle diameter 6 μm to 9 μm is 10% by weight to 30% by weight, ii. a light diffusion silica having an average particle diameter 10 μm to 15 μm is 15% by weight to 40% by weight, and iii. a porous silica having an average particle diameter 10 μm to 22 μm is 15% by weight to 40% by weight) is contained (solid content) in a range of 10% by weight to 80% relative to the entire coating agent.

JP-A No. 11-291619 discloses an inkjet recording film which is a sequential lamination of an adhesive layer and an ink accepting layer, where the adhesive layer has main components including (A) a binder, (B) a coating film forming assistant, and (C) a cross-linking agent, and the ink accepting layer has main components including a binder having the same component as that of (A), (D) coarse face forming agent, a cross-linking agent having the same component as that of (C), and (E) catalyst, with the weight ratio of the binder to the coarse face forming agent 2:3 or 1:3. JP-A No. 11-301093 discloses an inkjet record material having an ink solvent transmitting layer which transmits solvent on to an ink accepting layer but not transmit pigment. JP-A No. 2000-1043 discloses an aqueous ink record material which is made from i) polyacetal resin, urea-glyoxal-acryl amide polycondensation product and epoxy compound, and resin composition composed of fine particle. JP-A No. 2000-79752 discloses an inkjet recording body containing silica and the like, and a cationic resin having cationic strength 1.5 m equivalent/g to 6 equivalent/g.

JP-A No. 2000-79752 and JP-A No. 2000-79754 disclose a record sheet which is partly deletable and which bears an inkjet printing pattern by means of a pigment ink which is incompatible with an ink accepting layer. JP-A No. 2000-127610 discloses an inkjet record sheet made from a porous starch particle and a binder resin, where an inorganic or organic particle is embedded into the porous starch particle. JP-A No. 2000-190622 discloses an inkjet record material formed of an ink accepting layer which contains an inorganic pigment, a water-soluble resin, and a metal salt (which has ion valence of 2 or more). JP-A No. 2000-238420 discloses an inkjet record sheet, where a pigment relative to a binder agent is 100 weight part relative to a range of 10 weight part 50 to weight part, a recording layer has main components including i) a synthetic silica (as pigment) having average particle diameter 3 μm to 15 μm and ii) a polyvinyl alcohol having saponification 96 mol % or more (binder agent), and quaternary ammonium salt polymer 1 weight part to 40 weight part relative to the pigment 100 weight part, and hardener 20 weight part to 100 weight part relative to the binder agent 100 weight part are contained.

JP-A No. 2000-247014 discloses an aqueous ink record material having, as main component, polyvinyl acetal resin which is obtained by acetalizing polyvinyl alcohol using aromatic aldehyde. In the polyvinyl acetal resin, a particle composed of at least one selected from the group consisting of water-soluble acrylic resin, water-soluble epoxy compound, silic acid, silica, kaolin, clay, alumina, calcium carbonate, zeolite, titanium oxide, talc, and spherical high polymer. JP-A No. 2000-318298 discloses an inkjet record sheet which has a lower layer (containing resin film, amorphous synthetic silica and water-insoluble resin), and an upper layer (containing amorphous synthetic silica, water-insoluble resin and silanol-modified polyvinyl alcohol), and which has smoothness 5 seconds to 40 seconds.

Moreover, in terms of aluminum oxide accepting layer, JP-A No. 2000-37945 discloses an inkjet record sheet where an ink accepting layer is a fixed layer fixed by a binder which has, as main components, i) aluminum oxide fine particles (two different particle diameters) and ii) saponified polyvinyl alcohol (saponification 80 mol % to 95 mol %). JP-A No. 11-198520 discloses an inkjet record material which is a sequential lamination of aluminum oxide layer (γ-type or δ-type), and a high molecular-contained layer (water-soluble or water-swelled).

Any of the above publications fail to sufficiently meet the inkjet's properties such as ink absorption, image density, beading, fixing property (friction resistance), and the like.

OBJECTS AND ADVANTAGES

It is an object of the present invention to provide an inkjet recording method and an inkjet recording apparatus which solve the above conventional shortcomings. Especially, it is the object of the present invention to provide the inkjet recording method and the inkjet recording apparatus which are excellent in ejection stability and in storage stability, moreover, which can give the following images: i) having good color tone, ii) high image density, iii) high-sharpness recording image free from blur or feathering around character and image, iv) free from boundary color bleeding between different colors, v) free from unevenness, and vi) having rigidity such as waterproof, light-proof, and friction resistance.

Moreover, it is another object of the present invention to provide the inkjet recording method and the inkjet recording apparatus which can form high-quality and high rigidity image on various recording mediums.

After studying hard on the above problems, the present inventors have found the following: An ink composed of specific agents (such as wetting agent, penetrating agent and water-soluble organic solvent) by using an emulsion containing a coloring material in a polymer fine particle is low in surface tension even though the above ink has higher viscosity than the conventional ink. With the above ink which has high permeability, a vehicle may rapidly permeate in a high-speed printing of plain paper, thereby coloring material composition is likely to remain on the surface. In spite of the above, the above ink can bring about high chroma and high coloring density and bring about an image having a minute amount of strike-throughs.

Moreover, the present inventors have found the following. Combining the color ink (which contains a colored polymer fine particle and has the above structure) with the black ink (which uses a self-dispersion carbon black as a coloring material, and has high viscosity and low surface tension like the color pigment ink) can bring about the following effects at high-speed plain paper printing: increasing image density of black, extremely reducing color bleedings between black and color, being excellent in coloring property, and obtaining a record image excellent in both-side printing property with a minute amount of strike-throughs.

Moreover, in view of the black ink (which contains the self dispersion carbon black) and the color ink (which contains the colored polymer fine particle), the present inventors have found the following: Varying the types of the recording medium and varying the ink type or ink ratio according to the printing mode can record on various recording mediums an image that has high grade and excellent rigidity.

SUMMARY OF THE INVENTION

According to a first aspect of the present invention, there is provided an inkjet recording apparatus, comprising: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is optically transparent and is provided, on a transparent base material thereof, with an ink accepting layer, the recording-controlling unit controls recording on the recording medium such that the color ink ejecting portion is used for recording a monochrome image and a color image which has a plurality of colors, leaving the black ink ejecting portion substantially free from being used.

According to a second aspect of the present invention, there is provided an inkjet recording method, comprising: using an inkjet recording apparatus which comprises: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is optically transparent and is provided, on a transparent base material thereof, with an ink accepting layer, the recording-controlling unit controls recording on the recording medium such that the color ink ejecting portion is used for recording a monochrome image and a color image which has a plurality of colors, leaving the black ink ejecting portion substantially free from being used. When the recording medium is optically transparent and is provided, on the transparent base material thereof, with the ink accepting layer, the inkjet recording method uses the color ink for recording the monochrome image and the color image which has a plurality of colors, leaving the black ink substantially free from being used.

According to a third aspect of the present invention, there is provided an inkjet recording apparatus, comprising: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is provided, on an opaque base material thereof, with an ink accepting layer which has a surface having a gloss, the recording-controlling unit controls recording on the recording medium such that the color ink ejecting portion is used for recording a monochrome image and a color image which has a plurality of colors, leaving the black ink ejecting portion substantially free from being used.

According to a fourth aspect of the present invention, there is provided an inkjet recording method using an inkjet recording apparatus which comprises: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is provided, on an opaque base material thereof, with an ink accepting layer which has a surface having a gloss, the recording-controlling unit controls recording on the recording medium such that the color ink ejecting portion is used for recording a monochrome image and a color image which has a plurality of colors, leaving the black ink ejecting portion substantially free from being used. When the recording medium is provided, on the opaque base material thereof, with the ink accepting layer which has the surface having the gloss, the inkjet recording method uses the color ink for recording the monochrome image and the color image which has a plurality of colors, leaving the black ink substantially free from being used.

According to a fifth aspect of the present invention, there is provided an inkjet recording apparatus, comprising: a black ink ejecting portion configured to eject a black ink containing a self-dispersion pigment; and color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When a color image is recorded on a plain paper sheet and a black color area in the color image is recorded, the recording-controlling unit controls recording on the recording medium such that the black ink ejecting portion and the color ink ejecting portion are used in combination.

According to a sixth aspect of the present invention, there is provided an inkjet recording method, comprising: using an inkjet recording apparatus which comprises: a black ink ejecting portion configured to eject a black ink containing a self-dispersion pigment; and color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When a color image is recorded on a plain paper sheet and a black color area in the color image is recorded, the recording-controlling unit controls recording on the recording medium such that the black ink ejecting portion and the color ink ejecting portion are used in combination. When the color image is recorded on the plain paper sheet and the black color area in the color image is recorded, the inkjet recording method controls recording such that the black ink and the color ink are used in combination.

According to a seventh aspect of the present invention, there is provided an inkjet recording apparatus, comprising: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is provided, on an opaque base material thereof, with an ink accepting layer which has a surface free from a gloss and a black color area in the color image is recorded, the recording-controlling unit controls recording such that the black ink ejecting portion and the color ink ejecting portion are used in combination.

According to an eighth aspect of the present invention there is provided an inkjet recording method using an inkjet recording apparatus which comprises: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording medium is provided, on an opaque base material thereof, with an ink accepting layer which has a surface free from a gloss and a black color area in the color image is recorded, the recording-controlling unit controls recording such that the black ink ejecting portion and the color ink ejecting portion are used in combination. When recording the color image on the recording medium which is provided, on the opaque base material thereof, with the ink accepting layer which has the surface free from the gloss, and when the black color area in the color image is recorded, the inkjet recording method controls recording such that the black ink and the color ink are used in combination.

According to a ninth aspect of the present invention, there is provided an inkjet recording apparatus, comprising: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording is carried out on the recording medium which is in at least one of the following cases: the recording medium is optically transparent and is provided, on a transparent base material thereof, with an ink accepting layer, and the recording medium is provided, on an opaque base material thereof, with an ink accepting layer which has a surface having a gloss, the recording-controlling unit controls recording on the recording medium such that the color ink ejecting portion is used for recording a monochrome image and a color image which has a plurality of colors, leaving the black ink ejecting portion substantially free from being used. When a black color area in the color image is recorded in at least one of the following cases: the color image is recorded on a plain paper sheet, and the color image is recorded on the recording medium which is provided, on an opaque base material thereof, with an ink accepting layer which has a surface free from a gloss, the recording-controlling unit controls recording such that the black ink ejecting portion and the color ink ejecting portion are used in combination. In at least one of the following cases: recording the monochrome image on the plain paper sheet, and recording the monochrome image on the recording medium which is provided, on the opaque base material thereof, with the ink accepting layer which has the surface free from the gloss, the recording-controlling unit controls recording such that the black ink ejecting portion is used, leaving the color ink ejecting portion substantially free from being used.

According to a tenth aspect of the present invention, there is provided an inkjet recording method using an inkjet recording apparatus which comprises: a black ink ejecting portion configured to eject a black ink containing a self-dispersion pigment; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When the recording is carried out on the recording medium which is in at least one of the following cases: the recording medium is optically transparent and is provided, on a transparent base material thereof, with an ink accepting layer, and the recording medium is provided, on an opaque base material thereof, with an ink accepting layer which has a surface having a gloss, the recording-controlling unit controls recording on the recording medium such that the color ink ejecting portion is used for recording a monochrome image and a color image which has a plurality of colors, leaving the black ink ejecting portion substantially free from being used. When a black color area in the color image is recorded in at least one of the following cases: the color image is recorded on a plain paper sheet, and the color image is recorded on the recording medium which is provided, on an opaque base material thereof, with an ink accepting layer which has a surface free from a gloss, the recording-controlling unit controls recording such that the black ink ejecting portion and the color ink ejecting portion are used in combination. In at least one of the following cases: recording the monochrome image on the plain paper sheet, and recording the monochrome image on the recording medium which is provided, on the opaque base material thereof, with the ink accepting layer which has the surface free from the gloss, the recording-controlling unit controls recording such that the black ink ejecting portion is used, leaving the color ink ejecting portion substantially free from being used. In at least one of the following cases: the recording medium is optically transparent and is provided, on the transparent base material thereof, with the ink accepting layer, and the recording medium is provided, on the opaque base material thereof, with the ink accepting layer which has the surface having the gloss, the inkjet recording method controls recording on the recording medium such that the color ink is used for recording the monochrome image and the color image which has a plurality of colors, leaving the black ink substantially free from being used. When the black color area in the color image is recorded in at least one of the following cases: the color image is recorded on the plain paper sheet, and the color image is recorded on the recording medium which is provided, on the opaque base material thereof, with the ink accepting layer which has the surface free from the gloss, the inkjet recording method controls recording such that the black ink and the color ink are used in combination. In the following case: recording the monochrome image, the inkjet recording method controls recording such that the black ink is used, leaving the color ink substantially free from being used.

According to an eleventh aspect of the present invention, there is provided an inkjet recording apparatus, comprising: a black ink ejecting portion configured to eject a black ink containing a self-dispersion pigment, and a polymer emulsion as a fixing agent; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When a black color area in the color image is recorded in any one of the following cases: i) the recording medium is optically transparent and is provided, on a transparent base material thereof, with an ink accepting layer, ii) the recording medium is provided, on an opaque base material thereof, with an ink accepting layer which has a surface having a gloss, iii) a color image is recorded on a plain paper sheet, and iv) the recording medium for recording the color image is provided, on an opaque base material thereof, with an ink accepting layer which has a surface free from a gloss, the recording-controlling unit controls recording such that the black ink ejecting portion and the color ink ejecting portion are used in combination.

According to a twelfth aspect of the present invention, there is provided an inkjet recording method using an inkjet recording apparatus which comprises: a black ink ejecting portion configured to eject a black ink containing a self-dispersion pigment, and a polymer emulsion as a fixing agent; color ink ejecting portions configured to eject, respectively, a cyan ink, a magenta ink and a yellow ink which comprise a polymer emulsion which comprises a polymer fine particle containing a coloring material which is insoluble in water or slightly soluble in water; and a recording-controlling unit configured to control recording. The black ink ejecting portion and the color ink ejecting portion scan relative to a recording medium, to thereby record an image on the recording medium. When a black color area in the color image is recorded in any one of the following cases: i) the recording medium is optically transparent and is provided, on a transparent base material thereof, with an ink accepting layer, ii) the recording medium is provided, on an opaque base material thereof, with an ink accepting layer which has a surface having a gloss, iii) a color image is recorded on a plain paper sheet, and iv) the recording medium for recording the color image is provided, on an opaque base material thereof, with an ink accepting layer which has a surface free from a gloss, the recording-controlling unit controls recording such that the black ink ejecting portion and the color ink ejecting portion are used in combination. When the black color area in the color image is recorded in any one of the following cases: i) the recording medium is optically transparent and is provided, on the transparent base material thereof, with the ink accepting layer, ii) the recording medium is provided, on the opaque base material thereof, with the ink accepting layer which has the surface having the gloss, iii) the color image is recorded on the plain paper sheet, and iv) the recording medium for recording the color image is provided, on the opaque base material thereof, with the ink accepting layer which has the surface free from the gloss, the inkjet recording method controls recording such that the black ink ejecting portion and the color ink ejecting portion are used in combination.

DESCRIPTION OF THE PREFERRED EMBODIMENTS

Hereinafter described referring to drawings is a recording liquid cartridge receiving therein a recording liquid and an inkjet recording apparatus equipped with the recording liquid cartridge, of the present invention. Of the present invention, structural examples shown below are, however, not limited thereto.

Figure 1:
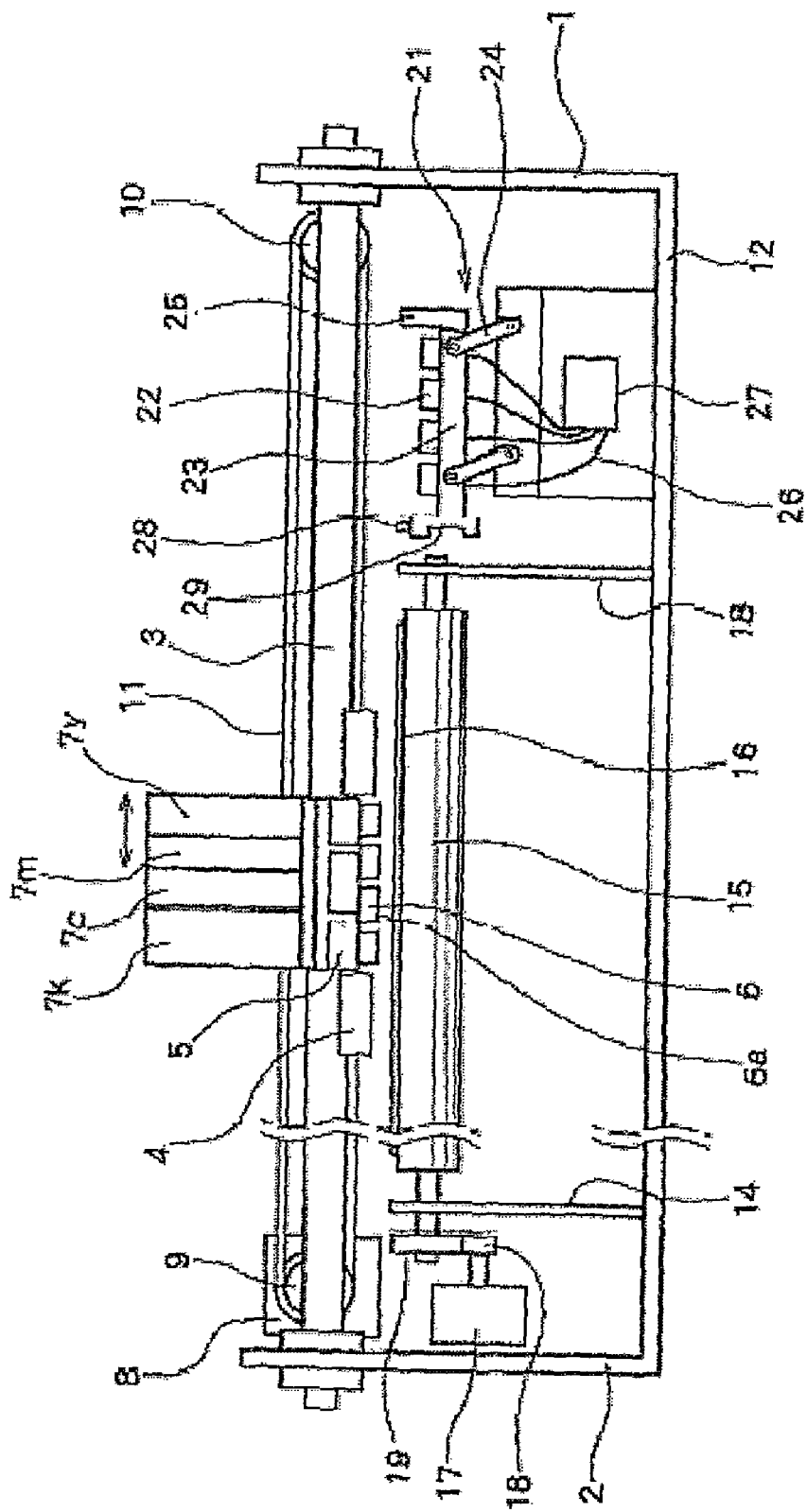
FIG. 1 is a schematic front view of a mechanism part of a serial inkjet recording apparatus of the present invention which incorporates therein an ink cartridge receiving therein a recording liquid.

FIG. 1 is a schematic front view of a mechanism part of a serial inkjet recording apparatus which incorporates therein an ink cartridge equipped with a recording liquid receiver receiving therein a recording liquid, of the present invention.

The mechanism part of the inkjet recording apparatus has the following structure: Between a side plate (1) and a side plate (2), a main guide rod (3) and a follower guide rod (4) are suspended substantially horizontally. By means of the main guide rod (3) and the follower guide rod (4), a carriage unit (5) is born in such a manner as to slide in a main scanning direction. The carriage unit (5) incorporates therein four inkjet heads (6) respectively ejecting a yellow ink (Y), a magenta ink (M), a cyan ink (C), and a black ink (Bk), with ejection faces (6a) (nozzle face) thereof turning downward. On an upper side of the inkjet heads (6) of the carriage unit (5), four ink cartridges ((7y), (7m), (7c), (7k)) are replaceably installed which supply respective colors to the four inkjet heads (6).

The carriage unit (5) has such a structure where driving and controlling a main scanning motor (8) connected to a timing belt (11) tensed between a driving pulley (driving timing pulley) (9) (which is rotated with the main scanning motor (8)) and a follower pulley (idler pulley) (10) can move the carriage unit (5) and the four inkjet heads (6) in the main scanning direction.

A sub-frame (13) and a sub-frame (14) stand on a base plate (12) connecting the side plate (1) and the side plate (2). Between the sub-frame (13) and the sub-frame (14), a conveyer roller (15) is rotatably born for conveying a paper sheet (16) in a sub-scanning direction perpendicular to the main scanning direction. A sub-scanning motor (17) is disposed beside the sub-frame (14). For conveying a rotation of the sub-scanning motor (17) to the conveyer motor (15), there are provided a gear (18) fixed to a rotary shaft of the sub-scanning motor (17) and a gear (19) fixed to a shaft of the conveyer roller (15).

Moreover, between the side plate (1) and the sub-frame (12), there is provided a reliability maintaining-recovering mechanism (hereinafter referred to as "sub system") (21) of the inkjet head (6). A holder (23) holds four cap members (22) for respectively capping the ejection faces of the inkjet heads (6). The holder (23) is swingably held with a link member (24). Moving the carriage unit (5) in the main scanning direction such that the carriage unit (5) abuts on an engagement portion (25) disposed on the holder (23) can lift the holder (23) in accordance with the movement of the carriage unit (5), thereby the cap members (22) may cap the ejection faces (6a) of the inkjet heads (6). On the contrary, moving the carriage unit (5) to a printing area side may lower the holder (23) in accordance with the movement of the carriage unit (5), thereby the cap members (22) may be spaced apart from the ejection faces (6a) of the inkjet heads (6).

Each of the cap members (22) connects to an absorption pump (27) by way of an absorption tube (26). Moreover, the cap member (22) formed with an atmospheric opening communicates to an atmosphere by way of an atmospheric opening tube and an atmospheric opening valve. Moreover, a waste liquid pumped by the absorption pump (27) is drained to a waste liquid preservation tank (not shown) by way of a drain tube and the like. On a side of the holder (23), a wiper blade (28) is mounted to a blade arm (29). The wiper blade (28) is a wiping member made of an elastic material such as fiber member, bubbling member, rubber, and the like. The blade arm (29) is so born as to be swingable with a cam which is rotated by means of a driving member (not shown).

Figure 2:
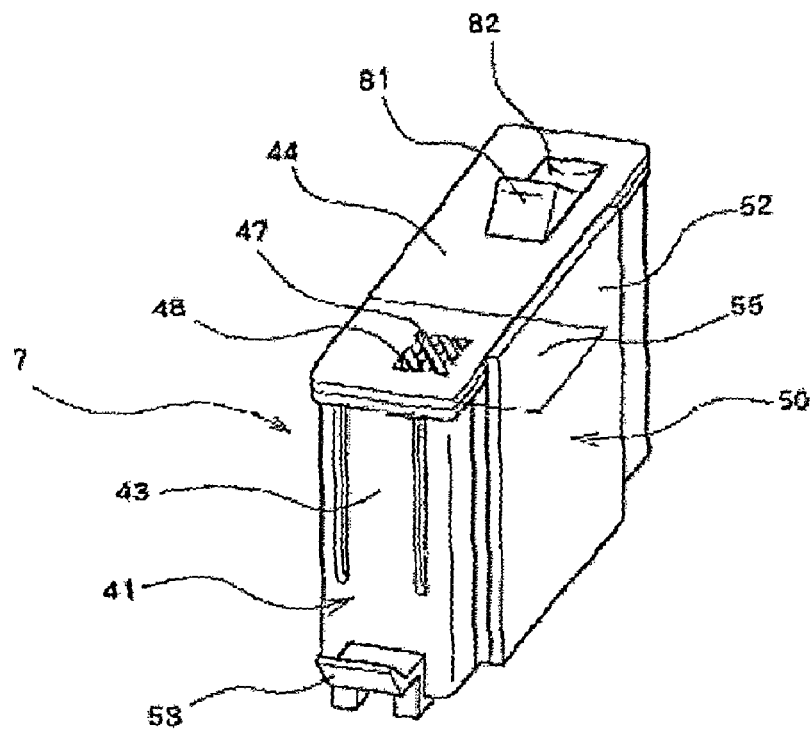
FIG. 2 is an external perspective view of the ink cartridge before being incorporated into the recording apparatus of the present invention.
Figure 3:
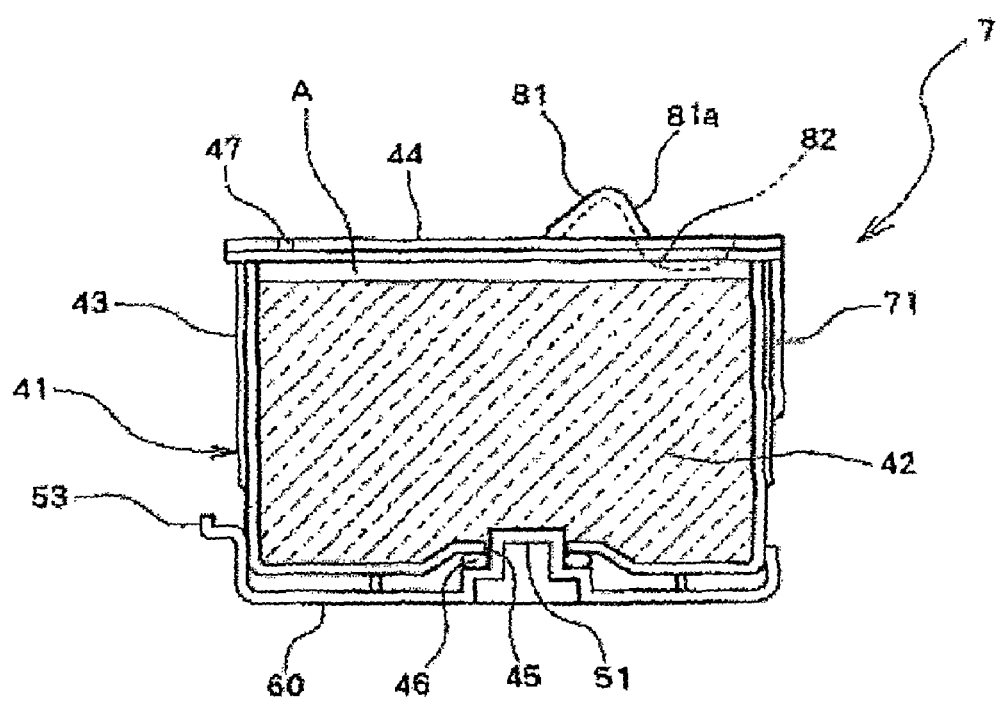
FIG. 3 is a cross section of the ink cartridge of the present invention.

Described next referring to FIG. 2 and FIG. 3 is the ink cartridge (7).

FIG. 2 is an external perspective view of the ink cartridge before being incorporated into the printer of the present invention. FIG. 3 is a cross section of the ink cartridge of the present invention.

As is seen in FIG. 3, the ink cartridge (7) has a cartridge body (41) receiving therein an ink absorbent (42) absorbing therein the in of specific color. The cartridge body (41) is so formed that an upper cover member (44) is adhered or welded to an upper opening of a case (43), and is a mold which is made, for example, by resin. The ink absorbent (42) is made of porous body such as urethane foam and the like. After being compressively inserted in the cartridge body (41), the ink absorbent (42) may absorb the ink.

The case (43) of the cartridge body (41) has a base portion which is formed with an ink supply port (45) for feeding the ink to the recording head (6). The ink supply port (45) has an inner periphery to mating with a seal ring (46). The upper cover member (44) is formed with an atmospheric opening (47).

A cap member (50) is mounted to the cartridge body (41). The cap member (50) may prevent leak of the inside ink which leak may be caused by a compressive deformation of the case (43) in the following state: i) before loading and when the ink supply port (45) is blocked, handling the ink cartridge (7) for loading or transportation, ii) or when a pressure is applied to a wide sidewall during vacuum packing.

As is seen in FIG. 2, the atmospheric opening (47) is sealed by sealing to the upper cover member (44) a film-shaped seal member (55) which has oxygen permeability of 100 ml/m² or more. The seal member (55) has such a dimension as to seal the atmospheric opening (47) and a plurality of grooves (48) which are formed around the atmospheric opening (47). Sealing the atmospheric opening (47) with the seal member (55) having the oxygen permeability of 100 ml/m² or more may bring about the following effect:

EFFECT

Even in the following state i) with the cartridge (7) packed under a decreased pressure using a pack member made of an aluminum laminate film and the like that is free from air permeability, and with the ink being loaded:

state i) an atmosphere present in a space (A) (see FIG. 3) that is formed between the ink absorbent (42) and the cartridge body (41) causes air to be dissolved in the ink; the air in the ink can be exhausted via the seal member (55) to a space (between the cartridge body (41) and the pack member which is disposed outside the cartridge body (41)) having a high degree of vacuum, thus improving degassing of the ink.

Figure 4:
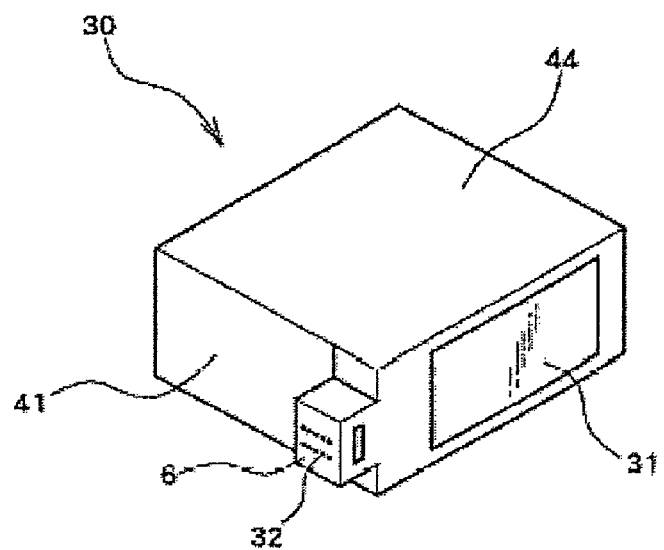
FIG. 4 is an external perspective view of a record unit which is integrated with a recording head of the present invention.

FIG. 4 shows a structural example of a record cartridge which is provided with an ink receiver (receiving therein the recording liquid) and a head portion for ejecting the recording liquid.

Specifically, a record unit (30) is of a serial type, which includes main elements such as an inkjet head (6), an ink tank (41) for receiving therein the recording liquid fed to the inkjet head (6), and a cover member for sealing an inner part of the ink tank (41). The ink head (33) is formed with a plurality of nozzles (32) for ejecting the recording liquid. The ink (recording liquid) is led to a common liquid chamber (not shown) by way of an ink supply tube (not shown), and is to be ejected from the nozzle (32) in accordance with an electric signal from a record device body which signal is inputted from an electrode (31). The record unit of the above type is referred to as so-called thermal type or bubble type which can be produced at low cost due to its structure, namely, a structure suitable for the head that has its driving source of thermal energy. The recording liquid of the present invention, with at least one of polyol having 8 to 11 carbon atoms and glycol ether having 8 to 11 carbon atoms added thereto in the printing method such as the above bubble type, thermal type and the like, can improve wetting property to a thermal element. With this, even a small amount of addition of the above components can bring about the ejection stability and frequency stability, and increase safety, which is preferable.

Figure 5:
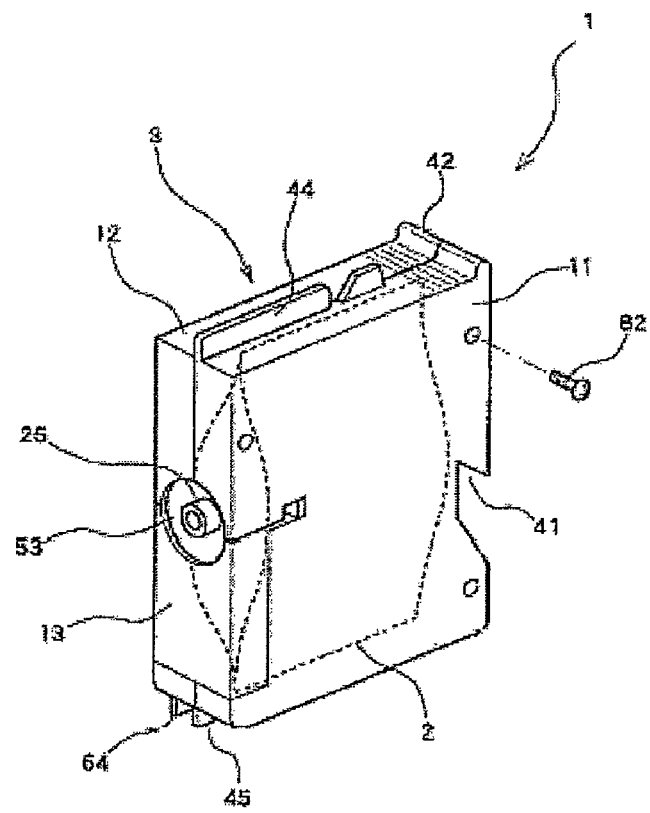
FIG. 5 is an external perspective view of another example of the ink cartridge of the present invention.

FIG. 5 shows an external perspective view of the ink cartridge, according to another example.

In an ink cartridge (1) in FIG. 5, an ink bag (2) is cased in a case body (3). The case body (3) is composed of a first structural member (11), a second structural member (12) and a third structural member (13) which are so structured as to be secured by a screw member (82). With the above structure, the ink cartridge (1) can be prevented from being naturally decomposed when the ink cartridge (1) is mounted to or dismounted from the recording apparatus body.

The ink cartridge (1) in FIG. 5 is provided with an ink supply port (25), an opening portion (53) for the ink supply port (25), a dent portion (41) for mounting the ink cartridge (1) to the recording apparatus body and dismounting the ink cartridge (1) from the recording apparatus body, a hook portion (42), a guide portion (44), and a guide portion (45). Moreover, the ink cartridge (1) is provided with a color identifying unit (64) for presenting the ink color.

Figure 6:
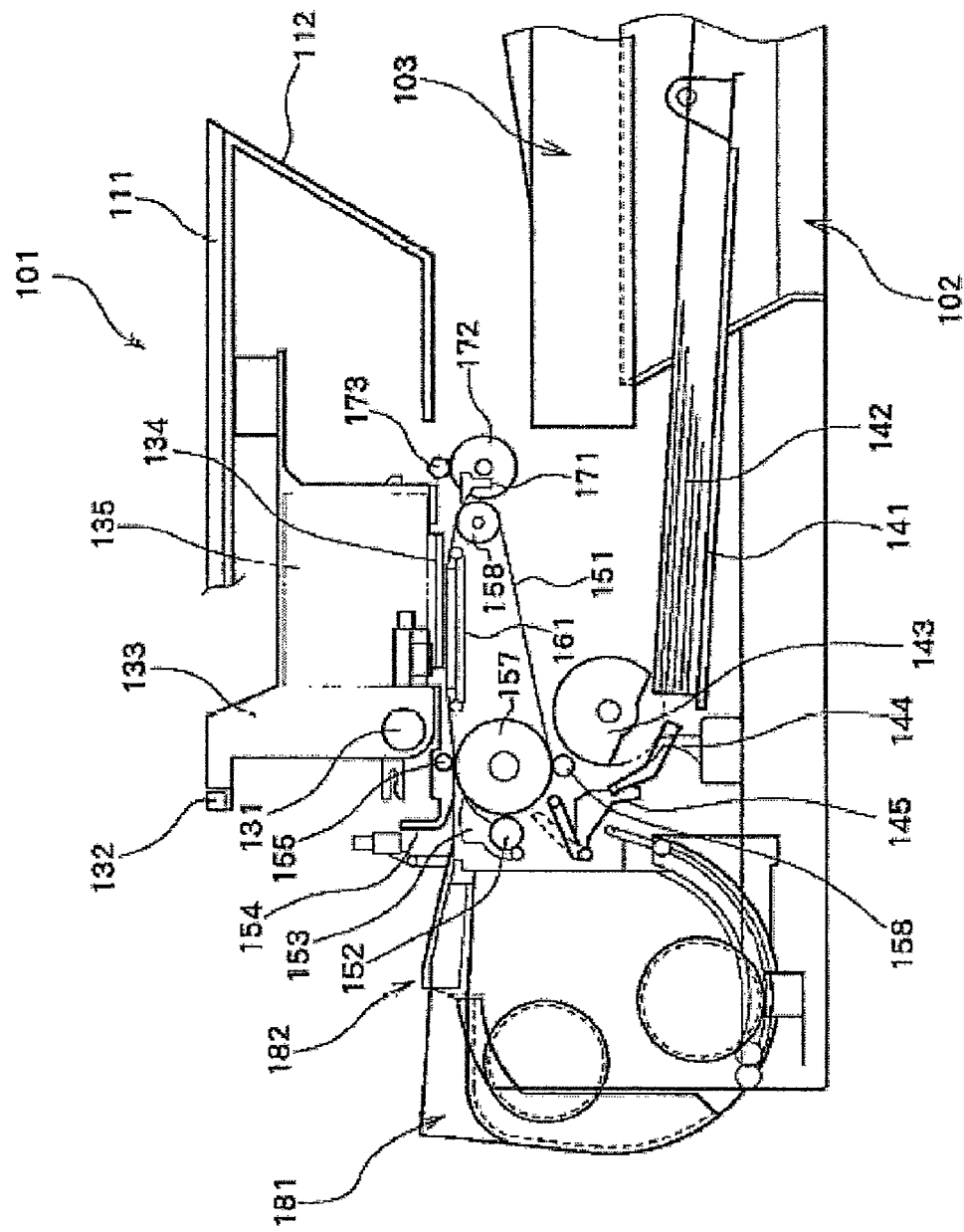
FIG. 6 is a schematic of another example of the inkjet recording apparatus of the present invention having the ink cartridge housing therein the recording liquid.

Hereinafter described referring to FIG. 6 is an example of the inkjet recording apparatus using the ink cartridge (1). FIG. 6 is a schematic for explaining an entire structure of the mechanism part of the inkjet recording apparatus.

The inkjet recording apparatus is provided with an apparatus body 101, a paper supply tray 102 installed to the apparatus body 101 and loaded with a paper sheet, a paper ejecting tray 103 installed to the apparatus body 101 and stocking the paper sheet where the image is recorded (formed). An upper cover 111 of the apparatus body 101 has substantially a flat upper face, and a front cover face 112 of the apparatus body 101 is inclined backward relative to the flat upper face of the upper cover 111. Below the inclined front cover face 112, there are provided the paper ejecting tray 103 and the paper supply tray 102 which protrude forward (near side).

In the apparatus body 101, as is seen in FIG. 6, by means of a guide rod 131 and a stay 132, a carriage 133 is held in such a manner as to slide in the main scanning direction, where the guide rod 131 is a guide member which is laterally suspended to a right plate (not shown) and a left plate (not shown). With the above structure, a main scanning motor (not shown) may move the carriage 133 for scanning.

The carriage 133 is provided with a recording head 134 having four inkjet heads for ejecting respective four ink droplets including yellow (Y), cyan (C), magenta (M) and black (Bk). Hereinabove, a plurality of ink ejection ports of the recording head 134 are arranged in a direction intersecting with the main scanning direction. The recording head 134 defines an ink droplet ejecting direction turning downward.

Examples of the inkjet head constituting the recording head 134 include the one having the following actuators and the like as energy generating unit for ejecting the ink: a piezoelectric actuator such as piezoelectric element, a thermal actuator using phase variation attributable to film boiling of the liquid by using electric heat exchanger element such as exothermic resistor, a shape-memorizing alloy actuator using metal phase variation attributable to temperature change, and an electrostatic actuator using electrostatic force.

The carriage 133 is provided with subtanks 135 for supplying various color inks to the recording head 134. By way of an ink supply tube (not shown), the ink can be supplied to the subtank 135 from the ink cartridge 1 (mounted to an ink cartridge mounting portion) of the present invention.

On the other hand, as a paper feeding portion for feeding a paper sheet 142 loaded on a paper loading portion 141 (pressure plate) of the paper supply tray 103, there is provided a separating pad 144 which is opposed to a lunula roll 143 (paper feed roll), and which is made of material having a large friction coefficient, where the lunula roll 143 separates the paper sheet 142 one-by-one and conveys the thus separated paper sheet 142 from the paper loading section 141. The separating pad 144 is biased to the paper feed roll 143's side.

As a conveying portion for conveying below the recording head 134 the thus supplied paper sheet 142 from the paper supply portion, there are provided i) a conveyor belt 151 for electrostatically absorbing the paper sheet 142 and conveying the paper sheet 142, ii) a counter roller 152 for conveying the paper sheet 142 (conveyed from the paper supply portion via a guide 145) by interposing the paper sheet 142 between the conveyor belt 151 and the counter roller 152, iii) a conveyor guide 153 for turning the paper sheet 142 (which is conveyed substantially vertically upward) by about 90°, to thereby smoothly put the paper sheet 142 on the conveyor belt 151, and iv) and an end pressuring roll 155 biased toward the conveyor belt 151's side by means of a pressing member 154. Moreover, there is provided a charging roller 156 which is a charging unit for charging a surface of the conveyor belt 151.

Herein, the conveyor belt 151 is an endless belt which is bridged between a conveyor belt 157 and a tension roller 158, to thereby have such a structure to as rotate in the belt conveying direction. The conveyor belt 151 is made from a pure resin which is not subjected to resistance control and has thickness about 40 μm. The conveyor belt 151 has i) a surface layer for paper absorbing face which is made from, for example, ETFE pure material, and ii) a back layer (intermediary resistance layer, earth layer) which has the same material as that for the surface layer and is subjected to the resistance control.

The conveyor belt 151 has a backside where a guide member 161 is located corresponding to a printing-photographing area defined by the recording head 134.

As a paper ejecting portion for ejecting the paper sheet 142 recorded by the recording head 134, there are provided a separating claw 171 for separating the paper sheet 142 from the conveyor belt 151, a paper ejecting roller 172, a paper ejecting roll 173, and the paper ejecting tray 103 below the ejecting roller 172.

On a backface of the apparatus body 101, a both-face paper supply unit 181 is detachably mounted. The both-face paper supply unit 181 takes therein the paper sheet 142 returned in an opposite rotary direction of the conveyor belt 151, and reverses the thus taken paper sheet 142 to thereby supply the paper sheet 142 again to between the counter roller 152 and the conveyor belt 151. The both-face paper supply unit 181 has an upper face provided with a manual paper feed portion 182.

With the above structure of the inkjet recording apparatus, the paper sheet 142 may be separated one by one and supplied from the paper supply portion substantially vertically upward, and then be guided by the guide 145, and then be interposed between the conveyor belt 151 and the counter roller 152. Then, with the end of the paper sheet 142 guided by the conveyor guide 153, the paper sheet 142 may be pressed on to the conveyor belt 151 by means of the end pressing roll 155 for turning by about 90°.

Hereinabove, the conveyor belt 157 is charged by the charging roller 156, and the paper sheet 142 is electrostatically absorbed to the conveyor belt 151 for conveyance. Moving the carriage 133 while driving the recording head 134 corresponding to an image signal can make a recording of 1 line by ejecting the ink droplet to the stationary paper sheet 142. Then, after the paper sheet 142 is conveyed by a predetermined amount, the next line recording is to be carried out. With a recoding end signal received or a signal signifying that the back end of the paper sheet 142 reached the recording area received, the recording operation is to be ended, to thereby eject the paper sheet 142 to the paper ejecting tray 103.

When it is sensed that the ink remnant comes to "near end" in the subtank 135, a predetermined amount of ink is to be supplied to the subtank 135 from the ink cartridge 1.

With the inkjet recording apparatus having the ink cartridge 1 of the present invention, when the ink cartridge 1 is used up, replacing only the ink bag 2 is possible by disassembling the case body 3. Even when the ink cartridge 1 is put longitudinally and loaded on the front face, the ink can be supplied stably. With this, even when the apparatus body 101 has a blocked upper portion (for example, the ink cartridge 1 is received in a rack, or when an object is put on the upper face of the apparatus body 101), replacing the ink cartridge 1 is accomplished with ease.

Hereinabove described is the serial inkjet recording apparatus. The recording liquid of the present invention may also be applied to so-called a line head recording apparatus where the nozzles are arbitrarily arranged in a form of a zigzag, and the density is such that it is substantially the same as the target image resolution or several fractions of the target image resolution, to be arranged with the recording medium's width or more.

Examples of the recording apparatus hereinabove include PC (host computer) and an output print for digital camera. In addition, examples of the recording apparatus hereinabove include an apparatus of complicated functions such as fax, scanner, telephone and the like.

When being used as the output printer of the PC, the inkjet recording apparatus is to be connected to the PC via a cable and controlled by means of a driver software installed in the PC.

The following Table 1 and Table 2 show the way of recording by using the inks to be selected according to the types of the recording medium, under the present invention. In the Table 1 and the Table 2, C denotes cyan ink, M denotes magenta ink, Y denotes yellow ink and K denotes black ink.

TABLE 1

(When black ink does not contain resin emulsion)

| Recording medium | Color mode | Monochrome mode |
| --- | --- | --- |
| OHP sheet | Three-color (CMY) recording (K) not used | Three-color (CMY) recording (K) not used |
| Gloss paper | Three-color (CMY) recording (K) not used | Three-color (CMY) recording (K) not used |
| Plain paper | Four-color (CMYK) recording | One-color (K) recording, or four-color (CMYK) recording |
| Mat coat paper | Four-color (CMYK) recording | One-color (K) recording, or four-color (CMYK) recording |

TABLE 2

(When black ink contains resin emulsion)

| Recording medium | Color mode | Monochrome mode |
| --- | --- | --- |
| OHP sheet | Four-color (CMYK) recording | One-color (K) recording, or four-color (CMYK) recording |
| Gloss paper | Four-color (CMYK) recording | One-color (K) recording, or four-color (CMYK) recording |
| Plain paper | Four-color (CMYK) recording | One-color (K) recording, or four-color (CMYK) recording |
| Mat coat paper | Four-color (CMYK) recording | One-color (K) recording, or four-color (CMYK) recording |

When the self-dispersion black ink does not contain the resin emulsion, for the recording medium (such as OHP sheet and gloss paper) having fine pore in the ink accepting layer surface, the black ink is substantially not used mainly due to deteriorated friction resistance. When the self-dispersion black ink contains the resin emulsion, the black ink is used due to improved friction resistance even to the OHP sheet and the gloss paper.

Hereinafter described is each mode of the present invention.

When the recording medium is provided, on a transparent base material thereof, with the ink accepting layer (namely, the recording medium is the OHP sheet and the like), the three color inks CMY are to be used for the color mode. The black part can be formed by overlapping the C, M and Y, which is what is called a composite black. The above formation of the black part is for the following reason: When the ink accepting layer of the recording medium has its main component of resin, recording the black part using the self-dispersion black ink may crack the recording part. When the ink accepting layer of the recording medium is made of transparent porous layer made of inorganic fine particles, the record image may lack friction resistance and thereby be peeled off with ease. The pigment of the self-dispersion black ink having large particle diameter cannot permeate into the ink accepting layer, and thereby may remain on the surface. Moreover, the pigment of the self-dispersion black ink does not contain a component that acts as binder. The color inks CMY also have pigment as coloring agent. The color inks CMY can, however, bring about a record image that is excellent in friction resistance for the following reason: The vinyl polymer, the polyester polymer, the polyurethane polymer and the like, which are used as a polymer forming the polymer emulsion, have high compatibility with the ink accepting layer, sufficiently accomplishing an effect as binder of the coloring agent.

For the same reason, in the case of the monochrome mode, the recording is to be carried out with the three colors CMY, namely, so-called the composite black.

When a recording medium is provided, on an opaque base material thereof, with an ink accepting layer having a surface having a gloss (namely, in the case of gloss paper and the like), the color mode and the monochrome mode are to be recorded with the tree color inks CMY, for the reasons described in the above OHP sheet's case.

When the recording medium is plain paper, the color mode is to be recorded with four color inks CMYK. The plain paper is not provided with the ink accepting layer, has a rough surface of the recording medium, and has larger irregularity than the OHP sheet and the gloss paper. With the above features of the plain paper, even when the black part is recorded using the self-dispersion black ink, the pigment may be protected by the protrusion on the surface, securing friction resistance of the record image. In the case of the monochrome mode, the black ink only is to be used for the recording. Of the present invention, the plain paper is the one generally used at the office and is not provided with the ink accepting layer.

When the recording medium is provided, on the opaque base material thereof, with the ink accepting layer having the surface free from the gloss, like the case of the plain paper, the color mode is to be recorded with the four inks CMYK. On the other hand is this case, for the monochrome mode, the black ink alone is to be used for the recording. A mat coat which is referred to as a special paper sheet for the inkjet has comparatively a large irregularity, although not as large as that of the plain paper. Therefore, when the black part of the mat coat paper is recorded using the self-dispersion black ink, the pigment may be protected by the protrusion on the surface, securing friction resistance of the record image.

Figure 7:
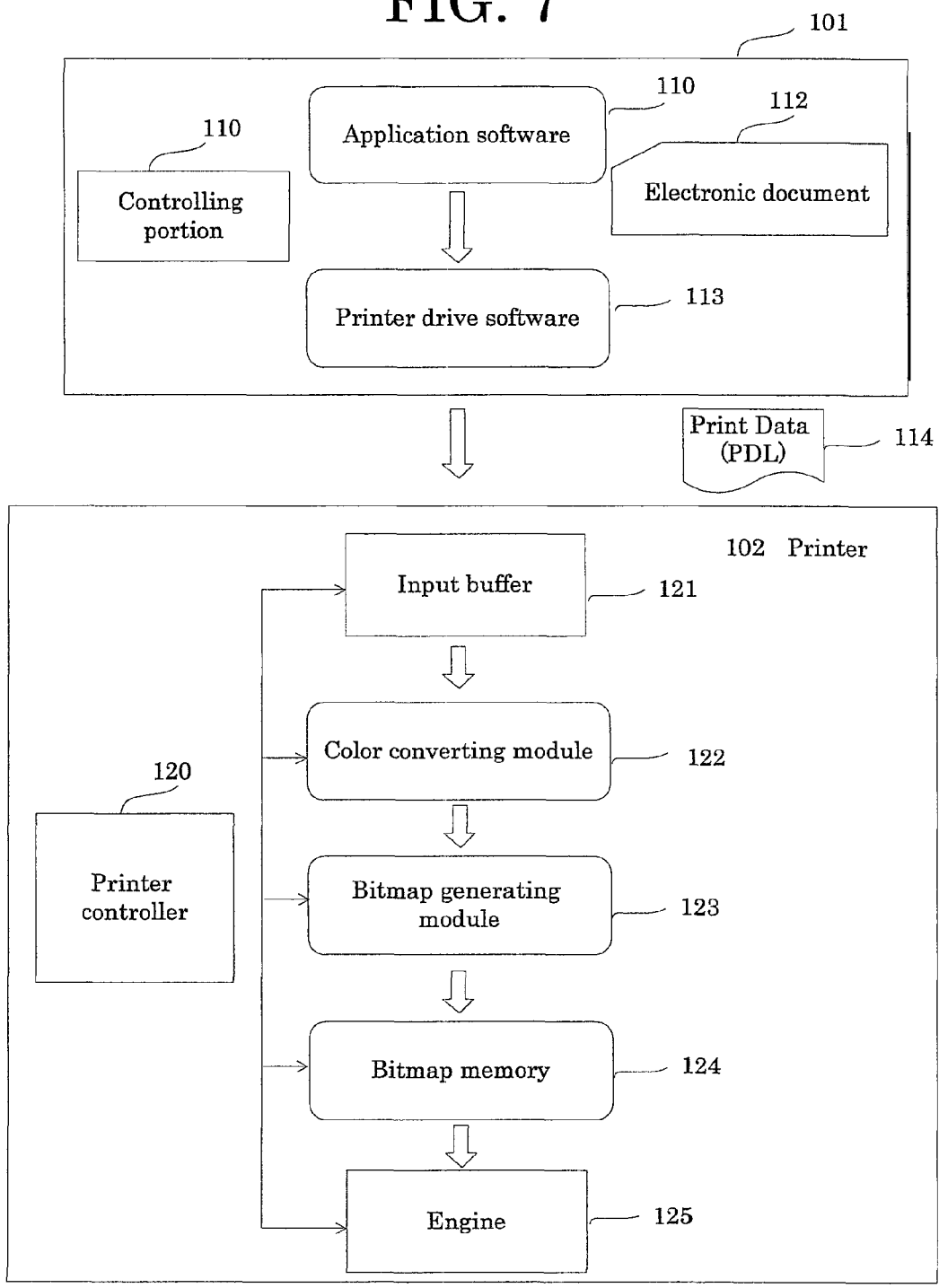
FIG. 7 is a block diagram showing a structure of a print system according to a first embodiment of the present invention.

FIG. 7 is a block diagram showing an example of the system of the inkjet recording apparatus of the present invention.

The print system has a host computer 101 and a printer 102, where the host computer 101 transforms document data composed of a character part, a line drawing part, and a photograph part, and the printer 102 may convert a drawing command row from the host computer 101 into a bitmap image.

The host computer 101 has a controlling portion 110 realized by a microcomputer inducing CPU, ROM, RAM and the like. The controlling portion 110 may carry out an application software 111, to thereby develop an electronic document 112 (document data) composed of the character part, the line drawing part, and the photograph part. The document data 112 is to be converted into a print data (PDL) which is the drawing command row interpreted by the printer 102 with a printer driver software 113, thereby to be transferred to the printer 102.

The printer 102 is a printing apparatus (that is capable of printing a color) such as a color laser printer and the like. A printer controller 120 realized by the microcomputer including the CPU, the ROM, the RAM and the like may read the print data 114 transferred from the host computer 101 to an input buffer 121.

The printer controller 120 may interpret the drawing command row of the print data 114 stored in the input buffer 121. When the thus interpreted drawing command row is color information, a color converting module 122 may carry out i) a procedural treatment (generating black color (BG)/removing under color (UCR)) and ii) a controlling treatment (namely, controlling an in-printing ink's total amount), to thereby convert the drawing command row into CMYK value.

In the case of the drawing information, a bitmap generating module 123 may develop a drawing pattern on a bitmap memory 124 in accordance with the CMYK value determined by the color converting module 122. When the drawing command is a print start command, the bitmap image which was so far developed on the bitmap memory 124 may be printed on the record paper with an engine (inkjet head portion) 125.

Figure 8:
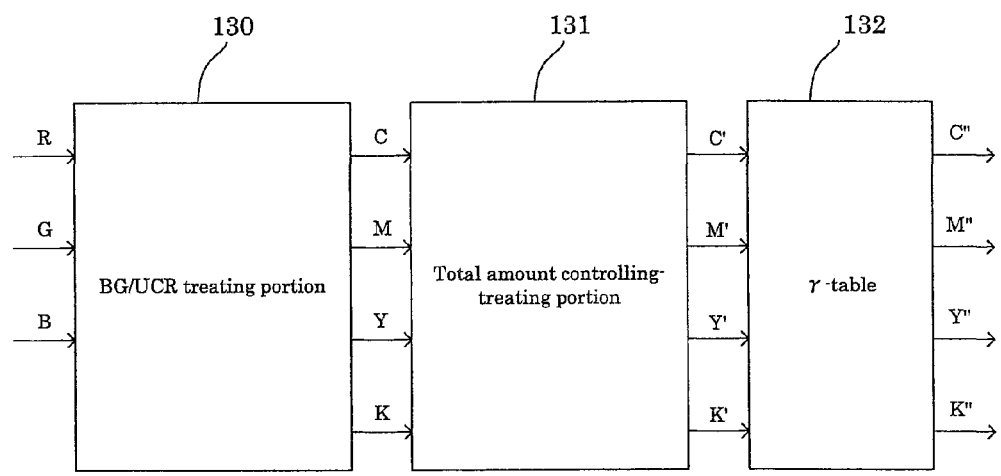
FIG. 8 is a block diagram showing a structure of a color-modifying module of the present invention.

Hereinafter described is the color converting module 122 of the present invention. FIG. 8 shows a general color converting module, according to the conventional technology. A BG/UCR treating portion 130 may subject an input RGB to a BG/UCR procedural treatment, to thereby convert the input RGB into CMYK. In the case of the character part and the line drawing part, the input RGB hereinabove signifies color density. In the case of the photography part, the input RGB signifies density of each pixel.

Moreover, when the total of the CMYK is over a predetermined value, a total amount controlling-treating portion 131 may correct the total CMYK's value within the predetermined value, and finally γ conversion is to be carried out with a γ table 132. The total amount controlling-treating portion 131 and the γ table 132 table are reversible.

The printer controller 120 and the color converting module 122 subject the character part, the line drawing part and the photograph part of the drawing command row of the document data to respectively different black generating procedural treatments and respectively different under color removal procedural treatments, followed by bit-imaging.

Moreover, the total amount controlling-treating portion 131 subject the character part, the line drawing part and the photograph part of the drawing command row of the document data to controls of respectively different in-printing ink's total amounts.

The host computer 101 of the print system may convert the document data into the drawing command row, and the printer 102 of the print system may carry out different BG/UCR procedural treatments respectively for the character part, the line drawing part and the photograph part of the drawing command row, followed by the bitmap imaging. Then, the printing is to be carried out on the data record paper which is subjected to the bitmap imaging.

In the printer 102, the character part, the line drawing part and the photograph part of the drawing command row are to be subjected to different in-printing ink' amount controls respectively.

Figure 9:
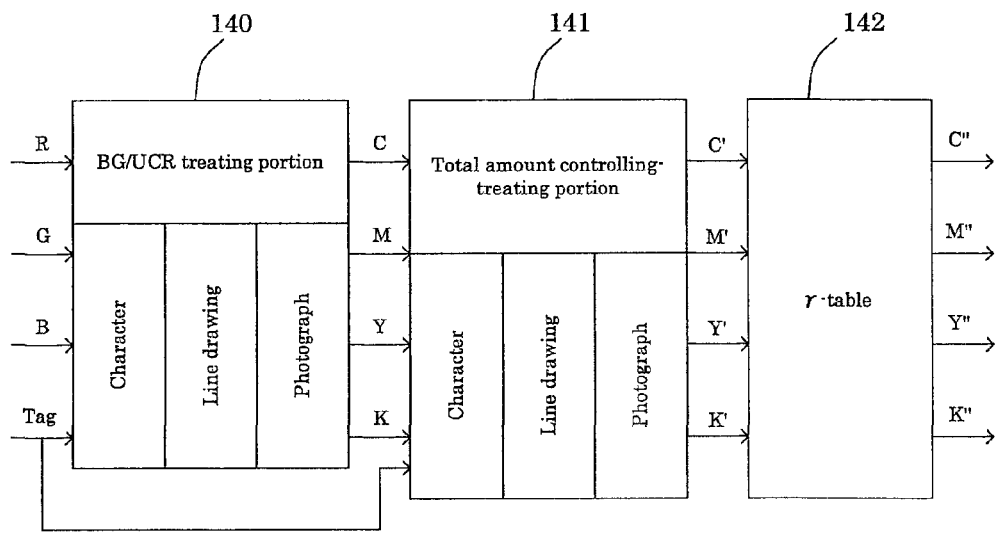
FIG. 9 is a block diagram showing another structure of the color-modifying module of the present invention.

FIG. 9 shows a block diagram of another structure of the color converting module 122 in FIG. 7. The color converting module 122 in FIG. 9 has the following difference from the conventional color converting module in FIG. 6: To signify for which part (among the character part, the line drawing part and the photograph part) the RGB value is used, the color converting module 122 in FIG. 9 inputs tag information (Tag) to a BG/UCR treating portion 140, together with the input RGB information.

The print system of this embodiment uses the PDL type printer 102 that carries out the bitmapping of the document data on the printer controller 120's side, thereby assuredly distinguishing whether the drawing pattern is the character part, the line drawing part or the photograph part.

The BG/UCR treating portion 140 subjects the character part, the line drawing part and the photograph part of the drawing command row to respectively different black generating procedural treatments and respectively different under color removal procedural treatments. In the treatments, the color character and the colored line put emphasis on sharpness than gradation, while the photograph part puts emphasis on gradation and hue.

Figure 10A:
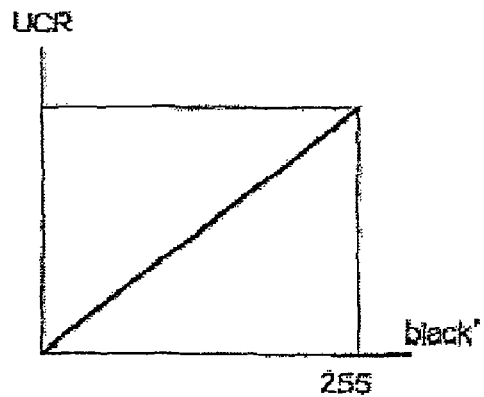
FIGS. 10A and 10B are line maps for explaining BG/UCR procedural treatment for character part and line image part in a BG/UCR treating section in FIG. 9.
Figure 10B:
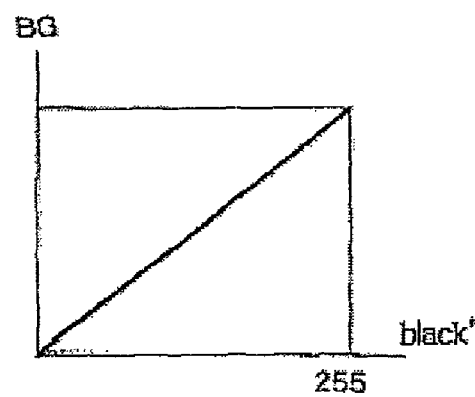

FIGS. 10A and 10B show line drawings for explaining the BG/UCR procedural treatments for the character part and the line drawing part in the BG/UCR treating portion 140. As is seen respectively in FIG. 10B and FIG. 10A, 100% BG procedural treatment and 100% UCR procedural treatment are to be carried out, where a minimum density contest is to be deducted from all colors by cyan density, magenta density and yellow density, and the thus deducted amount is to be replaced with black. In this case, the ink's total adhesion amount is decreased, thereby sharpening the document data as a whole.

In the above manner, the BG/UCR procedural treatment can be carried out without decreasing the gradation of the photograph part of the document data or without damaging sharpness of the character part.

Figure 11A:
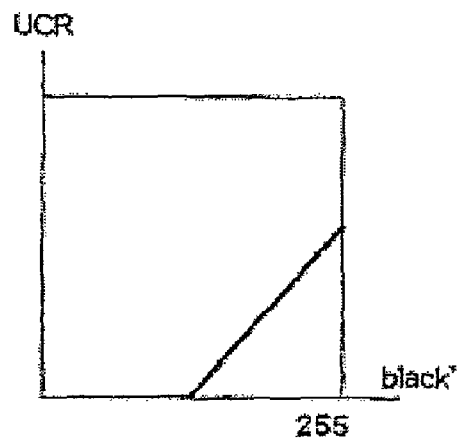
FIGS. 11A and 11B are line maps for explaining BG/UCR procedural treatment for photograph part in the BG/UCR treating section in FIG. 9.
Figure 11B:
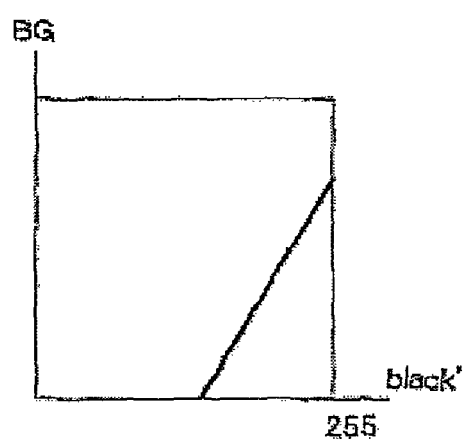

FIGS. 11A and 11B show line drawings for explaining the BG/UCR procedural treatments for the photograph part in the BG/UCR treating portion 140. As is seen respectively in FIG. 11B and FIG. 11A, the photograph part puts emphases on the gradation and hue, to thereby carry out the BG procedural treatment and the UCR procedural treatment. With this, the BG procedural treatment and the UCR procedural treatment are to be carried out within such an extent that the "color boundary bleeding," "beading," "drying failure" and "back-through" are not caused by the total adhesion amount.

The description is to be made in the case that the recording is carried out on an optically transparent recording medium which is provided, on a transparent base material thereof, with an ink accepting layer and carried out on a recording medium which is provided, on an opaque material thereof, with an ink accepting layer having a gloss. When recoding the monochrome image or the color image (which has a plurality of colors), the recording is carried out with the color ink only, substantially without the black ink. Therefore, the BG and the UCR are each preferred to be 10% or less, and more preferably 0%.

A total amount controlling-treating portion 141 in FIG. 9 controls respectively different ink's total amounts of the character part, the line drawing part and the photograph part. The above BG/UCR procedural treatment can decrease the ink's adhesion amount. This decreasing is, however, not accomplished when the input is the CMYK or a secondary color. Therefore, for suppressing the ink's bleeding, the total amount control is to be carried out on the CMYK value that is subjected to the BG/UCR procedural treatment.

In general, the ink's bleeding may easily be caused to the character edge, the thin line edge and the like. In terms of this, for input to the total amount controlling-treating portion 141, decreasing the ink's total amount in the case of the character part and the line drawing part can suppress the ink's bleeding of the character part and the line drawing part without damaging the gradation and the hue of the photograph part. Then, finally, the γ conversion is to be carried out with a γ table 142.

In the above manner, the ink's total amount can be suppressed without decreasing the gradation of the photograph part of the document data or damaging the sharpness of the character part of the document data.

Then, the ink's bleeding may be dependent on the printer 102's machine-to-machine difference, record paper, and the print output environment. In terms of this, providing a unit for inputting fine adjustment amount relative to the standard total control amount which is designated by an operation portion (not shown) of the printer 102 or by the printer deriver software 113 can absorb variation attributable to the machine-to-machine difference and the output environment.

Figure 12:
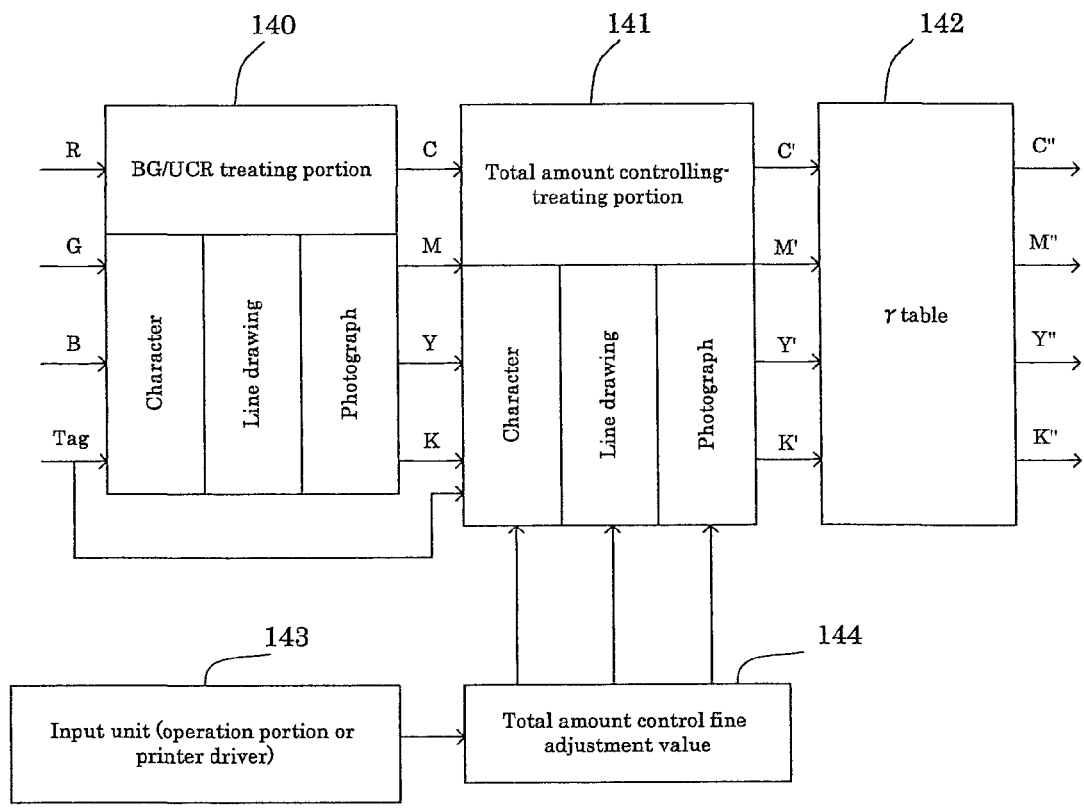
FIG. 12 is a block diagram showing another structural example of color-modifying module of the present invention.

FIG. 12 shows a block diagram of still another structure of the color converting module 122 in FIG. 7 of the present invention. A total amount control fine adjustment value 144 of each of the respective character part, line drawing part and photograph part inputted from an input unit 143 is to be set at the total amount controlling-treating portion 141. The input unit 143 is operated by i) the operation portion of the printer 102 or by ii) a printer driver which is realized by the printer controller 120 carrying out the printer driver software 113.

In the above print system, the input unit 143 operated by the operation portion or the printer driver can input to the total amount controlling-treating portion 141 the total amount control fine adjustment value 144 of the in-printing inks adaptable respectively to the character part, the line drawing part, and the photograph part of the drawing command row of the document data.

Namely, the input unit 143 inputs the fine adjustment value of the in-printing ink's total amounts adaptable respectively to the character part, the line drawing part, and the photograph part of the drawing command row of the document data.

In the above manner, for each of the character part, the line drawing part, and the photograph part of the document data, the ink's total amount control values can be adjusted to the optimum value according to the printing environment.

When interpreting the input data in the printing, the print system according to this embodiment carries out the BG/UCR procedural treatment after the tag information (whether the drawing pattern is the character part, the line drawing part or the photograph part) is determined, thereby enabling procedural treatments of the respective character part, line drawing part and photograph part of the data. With this, the gradation of the photograph part is not decreased, while the sharpness of the character part can be kept.

When interpreting the input data in the printing, the print system according to this embodiment carries out the ink's total amount controlling treatment after the tag information (whether the drawing pattern is the character part, the line drawing part or the photograph part) is determined, thereby enabling the total amount controls which are different respectively with the character part, the line drawing part and the photograph part of the document data.

When interpreting the input data in the printing, the print system according to this embodiment can adjust the ink's total control amounts of the respective character part, line drawing part and photograph part.

Described in the above embodiment is the print system, however, the printing apparatus having a combined function of the host computer 101 and the printer 102 can be used likewise.

In the above case, when the controlling portion and the like of the printing apparatus convert the document data into the drawing command row and the drawing command row is subjected to the bitmap imaging, it is acceptable that different black generating procedural treatments and different under color removal procedural treatments are to be carried out respectively on the character part, the line drawing part and the photograph part of the drawing command row, followed by the bitmap imaging.

Moreover, it is acceptable that a controlling unit for controlling different in-printing ink's total amounts is to be set up for carrying out controls respectively of the character part, the line drawing part and the photograph part of the drawing command row.

Moreover, it is acceptable that the operation portion and the like function as an input setting unit for inputting the in-printing ink's total amounts adapted respectively to the character part, the line drawing part and the photograph part of the drawing command row.

Hereinafter described is the ink used for the present invention.

A first feature of the ink of the present invention is use of an aqueous ink and an aqueous ink set which ink has a low surface tension of 40 mN/m or less at 25° C. After studying hard on various measures for improving dryness of the record image, the present inventors have found that adjusting the surface tension of the ink to 40 mN/m or less can bring about a speedy penetration-drying to substantially all record materials. The surface tension of the ink of 40 mN/m or less can better wetting state of the ink to a head member, thereby even a high-viscosity ink of 8 mPa·sec or more (25° C.) can improve frequency response and remarkably improve ejection stability. The ink having the above low surface tension can be obtained by combining a polyol (having 8 to 11 carbon atoms) or a glycol ether (having 8 to 11 carbon atoms) with an anionic surfactant or a nonionic surfactant.

A second feature of the present invention is a remarkable improvement in printing quality by using a high-viscosity ink (ink set) of 5 mPa·sec or more (25° C.), and more preferably 8 mPa·sec or more (25° C.). A low-viscosity ink of about 3 mPa·sec (25° C.) used for a conventional inkjet printer has its water content of about 70% by weight, while the ink having high viscosity of 8 mPa·sec (25° C.) can render its water content of about 50% by weight or less, increasing moisture-evaporation rate (caused when an ink droplet reaches a paper face) 2.0 times to 3.0 times. With this, a high-density pigment can increase its cohesion rate on the paper face, thus substantially eliminating the feathering.

A third feature of the present invention is that coloring material in the ink has a preferable density of 8% by weight or more (solid content), and more preferably 10% by weight or more (solid content). Increasing polymer emulsion density or pigment density can increase ink's viscosity, thereby easing cohesion of the pigment on the surface of the ink accepting layer of the recording medium and improving coloring density and color tone, in addition, substantially eliminating the feathering.

A fourth feature of the present invention is that a high-viscosity wetting agent is used which is a mixture of glycerin with at least one high-viscosity wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane, instead of a low-viscosity wetting agent which is a conventional mixture of a ethylene glycol (diethylene glycol) with a glycerin. Using the high-viscosity wetting agent can, in addition to a high pigment density, bring about a high-viscosity ink.

The ink composition of the present invention is preferably a recording ink having its ink viscosity of 5 mPa·sec or more, and more preferably 8 mPa·sec or more (25° C.), with a structure of the recording ink shown below. With a coloring material for printing and water for dispersing the coloring material as essential compositions, the ink of the present invention contains agents added upon necessity such as a wetting agent, a water-soluble organic solvent, one of an anionic surfactant and nonionic surfactant, an emulsion, a preservative, a pH regulator, and the like. Mixing a wetting agent 1 with a wetting agent 2 is for activating features of each of the wetting agents and for adjusting viscosity, but the above mixing of the wetting agent 1 and the wetting agent 2 is not always the case.

(1) Coloring agent
(2) Wetting agent 1 (glycerin)
(3) Wetting agent 2 (at least one selected from the group consisting of 1,3-butanediol, triethylene glycol, 1,6-hexanediol, propylene glycol, 1,5-pentanediol, diethylene glycol, dipropylene glycol, trimethylol propane, and trimethylol ethane)
(4) Water-soluble organic solvent
(5) Anionic surfactant or nonionic surfactant
(6) At least one of polyol having 8 to 11 carbon atoms and glycol ether having 8 to 11 carbon atoms
(7) Preservative
(8) pH regulator
(9) Pure water Hereinafter described are structural elements of each ink.

Examples of a coloring material for the black ink include carbon black. Preferably used carbon black is the one manufactured by furnace method, channel method and the like, and has a primary particle diameter 15 nm to 40 nm, a specific surface area 50 $m^2/g$ to 300 $m^2/g$ by BET absorbing method, and pH 2 to pH 9. Especially preferable is an acid carbon black having pH 6 or less, which has high density. Alternatively preferable are those so-called a self-dispersion carbon black such as a carbon black subjected to hypochlorous acid treatment, a carbon black subjected to sulfonation treatment, a carbon black which is subjected to treatment with diazonium compound and introduces anionic dissociation group such as carboxylic acid.

The black ink using the self-dispersion carbon black is excellent in ejection stability, and excellent in image density and character quality when printing is carried out onto the plain paper. Contrary to the above, short of friction resistance may be caused when the recording is carried out on to a recording medium (such as gloss paper) that is provided with an ink absorbing layer on the base material. For compensating the friction resistance, the self-dispersion carbon black may be added by resin emulsion.

A resin emulsion means an emulsion that has its continuous phase as water, and has its dispersion phase including the following resin compositions. The examples of the resin compositions of the dispersion phase include acrylic resin, vinyl acetate resin, styrene-butadiene resin, vinyl chloride resin, acryl-styrene resin, butadiene resin, styrene resin, and the like.

According to the preferable aspect of the present invention, the resin is preferred to be a polymer which is a combination of a hydrophilic part and a hydrophobic part. Particle diameter of the resin composition, as long as the emulsion can be formed, is not particularly limited, but is preferably about 150 nm or less, and more preferably 5 nm to 100 nm.

The resin emulsion can be obtained by mixing the resin particle in water, or by mixing the resin particle and the surfactant in water. For example, an emulsion of acrylic resin is obtained by mixing the acrylic resin and the surfactant in water, and an emulsion of styrene-acryl resin is obtained by mixing the styrene-acryl resin and the surfactant in water.

A preferable ratio (weight ratio) of mixture of resin composition to surfactant is ordinarily 10:1 to 5:1. Use of the surfactant less than the above range is unlikely to form the emulsion, while more than the above range is likely to decrease waterproof of the ink or deteriorate permeability, which are not preferable.

Ratio of resin (as dispersion phase components of the emulsion) to water is 100 weight parts of resin relative to 60 weight parts to 400 weight parts of water, and preferably 100 weight parts to 200 weight parts of water.

The examples of commercially available resin emulsions include Micro Gel E-1002 and Micro Gel E-5002 (styrene-acryl resin emulsion made by Nippon Paint), VONCOAT 4001 (acryl resin emulsion made by Dainippon Ink and Chemicals Incorporated), VONCOAT 5454 (styrene-acryl resin emulsion made by Dainippon Ink and Chemicals Incorporated), SAE-1014 (styrene-acryl resin emulsion made by ZEON CORPORATION), Sybynol SK-200 (acryl resin emulsion made by Saiden Chemical Industry Co., Ltd.), and the like.

The ink of the present invention is preferred to contain the resin emulsion having its resin composition of 0.1% by weight to 40% by weight relative to the ink composition, and more preferably 1% by weight to 25% by weight.

The resin emulsion has properties such as viscosity increase and cohesion, suppresses penetration of coloring composition, and promotes fixation to the record material. Moreover, some types of the resin emulsions may form a coat film on the record material, thereby improving friction resistance of the print.

A coloring material for color ink is made of a polymer emulsion which comprises a polymer fine particle containing the coloring material insoluble in water or unlikely to dissolve in water. Of the present invention, the term, "containing coloring material" means at least one of a first state of sealing the coloring material in the polymer fine particle and a second state of absorbing the coloring material to a surface of the polymer fine article. In this case, all the coloring materials blended with the ink of the present invention are not necessarily be sealed or absorbed to the polymer fine particle. Instead, within a scope that the effect of the present invention is not lost, the coloring material can be dispersed in the emulsion. As long as being insoluble in water or unlikely to dissolve in water, and having the property to be absorbed by the polymer, the above coloring material is not specifically limited.

Of the present invention, the term "insoluble in water" or the term "unlikely to dissolve in water" means that the coloring material is not dissolved by 10 weight parts or more relative to water 100 weight parts at 20° C. The above "dissolve" means that a visual inspection cannot find any separation or deposition of the coloring material on the solution's surface layer or lower layer. The examples of the above coloring material include dye (which is oil-soluble, dispersible, and the like), pigment, and the like. From the view point of good absorption and sealability, the oil-soluble dye or the dispersible dye is preferable, while in view of light resistance of the obtained image, the pigment is preferable.

From the view point of efficient impregnation in the polymer fine particle, each of the dyes of the present invention is preferably dissolved by 2 gaiter or more in an organic solvent such as ketone solvent, and more preferably 20 g/liter to 600 gaiter.

Examples of the usable color ink pigment for yellow ink include C. I. pigment yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, 153 and the like.

Examples of the usable color ink pigment for magenta include C. I. pigment red 1, 2, 3, 5, 7, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (red iron oxide), 104, 105, 106, 108 (cadmium red), 112, 114, 122 (dimethyl quinacridone), 123, 146, 149, 166, 168, 170, 172, 177, 178, 179, 185, 190, 193, 209, 219 and the like.

Examples of the usable color ink pigment for cyan include C. I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63 and the like.

Examples of the usable color ink pigment as intermediate color (for red, green and blue) include the following pigments which may be used alone or in combination. Moreover, the following pigments can be used for toning the magenta color and the cyan color.

C. I. pigment red 177, 194, 224, C. I. pigment orange 43, C. I. pigment violet 3, 19, 23, 37, and C. I. pigment green 7, 36.

The examples of other proper coloring pigments are described in "The Colour Index Edition 3 (The Society of Dyers and Colourists, 1982)."

For the pigment used as coloring agent, the above dyes can be used in combination for assisting and toning the color.

Blending of the above coloring material is about 10% by weight to 200% by weight relative to the polymer blending, and preferably about 25% by weight to 150% by weight.

The polymer constituting the polymer emulsion can use, for example, vinyl polymer, polyester polymer, polyurethane polymer, and the like. Especially preferred is the vinyl polymer and the polyester polymer, which are those disclosed in JP-A No. 2000-53897, JP-A No. 2000-53898 and JP-A No. 2001-139849.

According to a preferred aspect of the present invention, an average diameter of the polymer fine particles containing the above coloring materials is most preferably 0.16 μm or less in the ink.

Content of the polymer fine particle in the ink is preferably 8% by weight to 20% by weight (solid content), and more preferably 8% by weight to 12% by weight.

In terms of the wetting agent and the water-soluble organic solvent, the ink of the present invention uses the water as liquid medium. For the purpose of making a desired material property of the ink, preventing dryness of the ink, and improving dispersion stability, the following water-soluble organic solvents are to be used, a plurality of which can be combined.

Specific examples of the wetting agent and the water-soluble organic solvent include the following:

polyhydric alcohols such as ethylene glycol, diethylene glycol, triethylene glycol, propylene glycol, dipropylene glycol, tripropylene glycol, tetraethylene glycol, hexylene glycol, polyethylene glycol, polypropylene glycol, 1,5-pentane diol, 1,6-hexane diol, glycerol, 1,2,6-hexane triol, 1,2,4-butane triol, 1,2,3-butane triol, petriol, and the like;

polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like;

polyhydric alcohol aryl ethers such as ethylene glycol monophenyl ether, ethylene glycol monobenzyl ether, and the like;

nitrogen-contained heterocyclic ring compounds such as 2-pyrrolidone, N-methyl-2-pyrrolidone, N-hydroxyethyl-2-pyrrolidone, 1,3-dimethyl imidazolidinone, ε-caprolactam, γ-butyrolactone, and the like;

amides such as formamide, N-methyl formamide, N,N-dimethyl formamide, and the like;

amines such as monoethanol amine, diethanol amine, triethanol amine, monoethyl amine, diethyl amine, triethyl amine and the like;

sulfur-contained compounds such as dimethyl sulfoxide, sulfolane, thiodiethanol, and the like; propylene carbonate; ethylene carbonate; and the like.

Among the above organic solvents, especially preferable are diethylene glycol, thiodiethanol, polyethylene glycol 200 to 600, triethylene glycol, glycerol, 1,2,6-hexane triol, 1,2,4-butane triol, petriol, 1,5-pentane diol, 2-pyrrolidone, and N-methyl-2-pyrrolidone. The above organic solvents may bring about an excellent effect for preventing injection failure which may be caused by solubility and moisture-evaporation.

Other wetting agents preferably contain saccharide. The examples of the saccharide include monosaccharide, disaccharide, oligosaccharide (including trisaccharide and tetrasaccharide) and other polysaccharide. The examples of the preferable saccharide include glucose, mannose, fructose, ribose, xylose, arabinose, galactose, maltose, cellobiose, lactose, sucrose, trehalose, maltotriose, and the like. Herein, the term polysaccharide means the saccharide in a broad sense, including substances present extensively in nature such as α-cyclodextrin, cellulose, and the like.

Derivatives of the above saccharides include reduced sugar of the above saccharides (for example, sugar alcohol (expressed by a general formula $HOCH_2(CHOH)_nCH_2OH$ (where n is an integer of 2 to 5)), oxidized sugar (for example, aldonic acid, uronic acid, and the like), amino acid, thioic acid, and the like. Especially preferable is the sugar alcohol, the specific examples thereof including maltitol, sorbitol, and the like.

Content of the above saccharides is from 0.1% by weight to 40% by weight of ink composition, and preferably 0.5% by weight to 30% by weight.

Ratio of the pigment to the wetting agent has a great effect on the ejection stability of the ink from the head. High pigment solid content with a small blending of the wetting agent may accelerate moisture evaporation in the vicinity of ink meniscus of the nozzle, thus causing ejection failure.

Blending of the wetting agent is preferably from 10% by weight to 50% by weight. On the other hand, content of the polymer fine particle containing the coloring material is preferably 8% by weight or more, and more preferably 8% by weight to 20% by weight. With this, the ratio of the wetting agent to the polymer fine particle (solid content) is 0.5 to 6.25, more preferably 2.0 to 6.0, and most preferably 3.0 to 5.0. The ink within the above range may bring about favorable results in dryness test, storage stability test, and reliability test.

The surfactant used is anionic or nonionic. Based on combinations of i) types of coloring materials, ii) the wetting agents, and iii) the water-soluble organic solvent, the surfactant is to be selected such that the dispersion stability is not lost.

The examples of the anionic surfactant include salts such as polyoxyethylene alkylether acetate, dodecylbenzene sulfonate, salt of lauryl acid, polyoxyethylene alkylether sulfate, and the like.

The examples of the nonionic surfactant include polyoxyethylene alkylether, polyoxyethylene alkylester, polyoxyethylene sorbitan fatty acid ester, polyoxyethylene alkyl phenyl ether, polyoxyethylene alkylamine, polyoxyethylene alkylamide, and the like.

The examples of the acetylene glycol surfactant include acetylene glycols such as 2,4,7,9-tetramethyl-5-decin-4,7-diol, 3,6-dimethyl-4-octyne-3,6-diol, 3,5-dimethyl-1-hexine-3-ol. The examples of the acetylene glycols include Surfynol 104, Surfynol 82, Surfynol 465, Surfynol 485, and Surfynol TG (made by AIR PRODUCTS, U.S.A.), especially Surfynol 465, Surfynol 104 and Surfynol TG show a good printing quality.

The surfactants can be used alone or in combination of two or more.

Of the present invention, use of the surfactant can improve wetting property to the record paper. The examples of preferable surfactants include polyoxy ethylene alkyl ether acetate, dialkyl sulfosuccinate, polyoxy ethylene alkyl ether, polyoxy ethylene alkyl phenyl ether, polyoxy ethylene polyoxy propylene block copolymer, acetylene glycol, and the like. More specifically, as the anionic surfactant, use of at least one of polyoxyethylene alkylether acetate (see the following general formula (I)) and dialkyl sulfosuccinate having branched alkyl chain having 5 to 16 carbon chains (see the following general formula (II)) can improve plain paper property and obtain solubility and dispersion stability of the coloring agent.

$R_1—O—(CH_2CH_2O)mCH_2COOM$ (I)

($R_1$ denotes a branchable alkyl group having 6 to 14 carbon atoms, m denotes an integer of 3 to 12, M denotes an alkali metal ion, a quaternary ammonium, a quaternary phosphonium, and an alkanolamine.)

(II)

$CH_2COO—R_2$
|
$CH—SO_3M$
|
$COO—R_2$ ($R_2$ denotes a branched alkyl group having 5 to 16 carbon atoms, M denotes an alkali metal ion, a quaternary ammonium, a quaternary phosphonium, and an alkanolamine.)

The following chemical formulae specifically show the surfactants of the general formula (I) and the surfactants of the general formula (II) with free acid types.

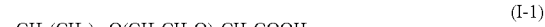
$CH_3(CH_2)_{12}O(CH_2CH_2O)_3CH_2COOH$ (I-1)

$CH_3(CH_2)_{12}O(CH_2CH_2O)_4CH_2COOH$ (I-2)

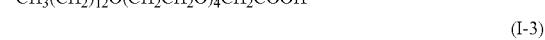
$CH_3(CH_2)_{12}O(CH_2CH_2O)_5CH_2COOH$ (I-3)

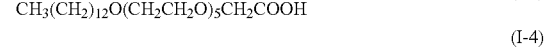
$CH_3(CH_2)_{12}O(CH_2CH_2O)_6CH_2COOH$ (I-4)

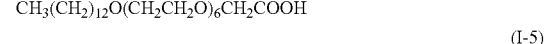
$CH_3(CH_2)_{11}CHO(CH_2CH_2O)_6CH_2COOH$ (I-5)
         |
        $CH_3$

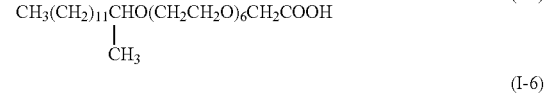
(I-6)
$CH_3(CH_2)_6$
         \\
          $CHO(CH_2CH_2O)_3CH_2COOH$
         /
$CH_3(CH_2)_5$

(II-1)
$\qquad\qquad CH_3\quad CH_3$
$\qquad\qquad |\quad\quad |$
$\qquad CH_2COOCHCH_2CHCH_3$
$\qquad |$
$HO_3S—CHCOOCHCH_2CHCH_3$
$\qquad\qquad |\quad\quad |$
$\qquad\qquad CH_3\quad CH_3$

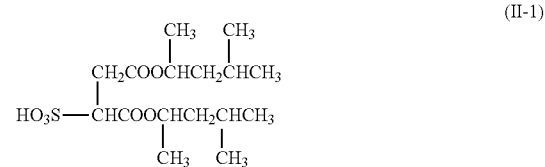
(II-2)
$\qquad\qquad CH_3$
$\qquad\qquad |$
$\qquad CH_2COOCHCH_2CH_2CH_3$
$\qquad |$
$HO_3S—CHCOOCHCH_2CH_2CH_3$
$\qquad\qquad |$
$\qquad\qquad CH_3$

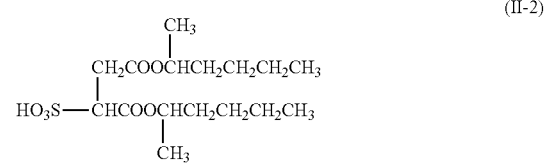

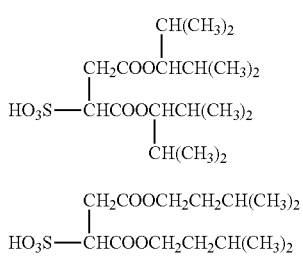

(II-3)

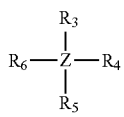

(II-4)

Using lithium ion, quaternary ammonium, and quaternary phosphonium (the latter two of which expressed by the following formula), as a counter ion of the surfactant of the present invention, can present an excellent solution stability of the surfactant.

$$R_6-\underset{\underset{R_5}{|}}{\overset{\overset{R_3}{|}}{Z}}-R_4$$

(In the above formula, Z denotes nitrogen or phosphor, $R_3$ to $R_6$ each denote one of hydrogen, alkyl group having 1 to 4 carbon atoms, hydroxy alkyl group having 1 to 4 carbon atoms, and halogenated alkyl group having 1 to 4 carbon atoms.)

The examples of preferable nonion surfactants include polyoxy ethylene alkyl phenyl ether expressed by the following general formula (III) polyoxy ethylene alkyl ether expressed by the following general formula (IV), polyoxy ethylene polyoxy propylene alkyl ethers expressed by the following general formula (V) and general formula (V'), acetylene glycol expressed by the following general formula (VI). Using the above anionic surfactants in combination can bring about a synergy effect such as permeability, thus decreasing color bleeding and character feathering of the ink.

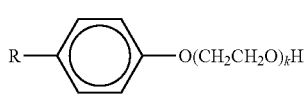

(III)

(R denotes a branchable hydrocarbon group having 6 to 14 carbon atoms, k=5 to 20)

R—(OCH₂CH)₂nOH    (IV)

(R denotes a branchable hydrocarbon group having 6 to 14 carbon atoms, k=5 to 20)

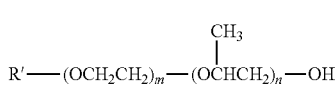

(V)

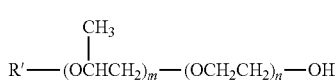

(V')

(R' denotes a hydrocarbon group having 6 to 14 carbon atoms, m≦20, n≦20)

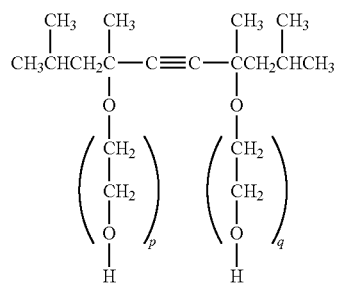

(VI)

(p, q = 0~40)

Setting the ink's pH at 6 or more can bring about the ink's storage stability. In so many occasions, the copy paper and the like used in the office have pH of 5 to 6. Recording on so-called a plain paper sheet in the following recording method can provide a record image having high quality and high resolution: ejecting the ink to the record paper from a fine ejection port of 9 μm to 60 μm thus causing a droplet of 3 ng by weight to 5 ng by weight at an injection rate of 5 m/s to 20 m/s, the amount of monochromatic adhesion being set at 1.5 g/m² to 30 g/m², Steckigt sizing degree of 3 seconds or more in the test method of JIS P-8122. When the surfactant expressed by the general formula (II) is used, pH of 9 or more is likely to cause, in the storage, material change attributable to decomposition. For use of the surfactant expressed by the general formula (II), it is preferable to set pH at 6 to 9.

The amount of the additives expressed by the general formulas (I), (II), (III), (IV), (V), (V'), and (VI) is in a range from 0.05% by weight to 10% by weight, giving a desired permeability to the ink's property required by the printer system. Less than 0.05% by weight in each case hereinabove may cause the color bleeding to a boundary between two overlapped colors, while more than 10% by weight in each case hereinabove is likely to cause deposition of the compound itself at low temperature thus decreasing reliability.

The surface tension of the present invention is an index of permeability into the paper, especially denoting a dynamic surface tension in a short time of 1 second or less after formation of the surface, which is different from a static surface tension measured at a saturation time. JP-A No. 63-31237 discloses a conventional method for measuring a dynamic surface tension of 1 second or less, which method is applicable. Of the present invention, however, Wilhelmy surface tension tester which is of a suspension type was used for measurement. The surface tension is preferably 40 mJ/m² or less, and more preferably 35 mJ/m² or less for obtaining excellent fixing property and dryness.

Of the present invention, the polyol or the glycol ether has 8 to 11 carbon atoms. Adding a partly water-soluble polyol and/or glycol (namely, solubility of 0.1% by weight to less than 4.5% by weight in water of 25° C.) by 0.1% by weight to 10.0% by weight relative to a total weight of the recording ink can improve the ink's wetting property to a thermal element, thus bringing about ejection stability and frequency stability even with a small amount of additives.

Preferable examples of the above include the following.

| | | |
|---|---|---|
| (1) | 2-ethyl-1,3-hexanediol | Solubility: 4.2% (at 20° C.) |
| (2) | 2,2,4-trimethyl-1,3-pentanediol | Solubility: 2.0% (at 25° C.) |

In the water of 25° C., a penetrant (polyol, glycol ether) having solubility of 0.1% by weight to less than 4.5% by weight can bring about an advantage in that the penetration property is very high, in place of the low solubility. Thus, in the water of 25° C., it is possible to make an ink with a very high penetration property by combining the penetrant (having solubility of 0.1% by weight to less than 4.5% by weight) with other solvent or with other surfactant.

The ink of the present invention may be added by a conventional additive other than the coloring agent, the solvent, the surfactant and the like which are described above.

The examples of usable preservatives (corrosion and mold) include sodium dehydroacetate, sodium sorbate, 2-pyridinethiol-1-oxide sodium, sodium benzoate, pentachlorophenol sodium, and the like.

The examples of pH regulators include arbitrary substances capable of regulating pH to 7 or more without causing a harmful effect on the ink thus regulated.

The other examples of pH regulator include amines such as diethanol amine, triethanol amine, and the like; hydrides of alkali metal elements such as lithium hydroxide, sodium hydroxide, potassium hydroxide, and the like; ammonium hydroxide; quaternary ammonium hydroxide; quaternary phosphonium hydroxide; carbonates of alkali metal such as lithium carbonate, sodium carbonate, potassium carbonate, and the like; and the like.

The examples of chelate reagent include ethylene diamine tetraacetic acid sodium, nitrilotriacetic acid sodium, hydroxyethyl ethylene diamine triacetic acid sodium, diethylene triamine acetic acid pentasodium, uramil diacetic acid sodium, and the like.

The examples of rustproof agent include sulphurous acid, sodium thiosulfate, ammonium thiodiglycolate, diisopropyl ammonium nitrite, pentaerythritol tetranitrate, dicyclohexyl ammonium nitrite, and the like.

Alternatively, according to the object, a water-soluble ultraviolet absorbent, a water-soluble infrared absorbent, and the like can be added.

EXAMPLE

Hereinafter described are examples and comparative examples of the present invention. The present invention is, however, not limited thereto.
<Preparation of Ink>

Coloring Agent

Preparation Example 1

Preparation of Phthalocyanine Pigment-Contained Polymer Fine Particle Dispersoid Based on the preparation example 3 of JP-A No. 2001-139849, the following operation was carried out.
(1) Preparation of Polymer Solution
At first, inside of a 1 L of flask equipped with a mechanical stirrer, a thermometer, a nitrogen gas introducing tube, a reflux tube, and a droplet funnel was sufficiently substituted with a nitrogen gas.

Then, a mixture of styrene 100.8 g, acrylic acid 25.2 g, lauryl methacrylate 108.0 g, polyethylene glycol methacrylate 36.0 g, hydroxyethyl methacrylate 60.0 g, styrene macromer (AS-6 made by Toagosei Co., Ltd.) 36.0 g, mercapto ethanol 3.6 g, azobis dimethyl valeronitrile 2.4 g, and methyl ethyl ketone 18 g was dropped in the flask for 2.5 hours.

After completion of the drop, a mixture of azobis dimethyl valeronitrile 0.8 g and methyl ethyl ketone 18 g was dropped in the flask for 0.5 hour. After maturing the resultant for 1 hour at 65° C., azobis dimethyl valeronitrile 0.8 g was added, followed by a further maturing for 1 hour.

After completion of the reaction, methyl ethyl ketone 364 g was added, to thereby obtain a polymer solution 800 g having density of 50% by weight.
(2) Preparation of Water Dispersoid of Polymer Fine Particle The polymer solution 28 g thus obtained in (1) above, phthalocyanine pigment 26 g (TGR-SD made by Dainippon Ink and Chemicals Incorporated), 1 mol/L of potassium hydroxide solution 13.6 g, methyl ethyl ketone 20 g, and ion exchanged water 30 g were sufficiently stirred. Then, three roll mills were used for mixing-kneading 20 times. The thus obtained paste was inputted in an ion exchange water 200 g, sufficiently stirred, then the methyl ethyl ketone and the water were distilled with an evaporator, to thereby obtain a blue polymer fine particle dispersoid.

Measured with a micro track UPA, the polymer fine particle showed an average particle diameter (D 50%) of 93 nm.

Coloring Agent

Preparation Example 2

Preparation of Dimethylquinacridone Pigment-Contained Polymer Fine Particle Dispersoid The preparation example 1 was likewise repeated except that the phthalocyanine pigment in the preparation example 1 was replaced with a pigment red 122, to thereby obtain a purple polymer fine particle dispersoid. Measured with the micro track UPA, the polymer fine particle showed an average particle diameter (D 50%) of 127 nm.

Coloring Agent

Preparation Example 3

Preparation of Monoazo Yellow Pigment-Contained Polymer Fine Particle Dispersoid The preparation example 1 was likewise repeated except that the phthalocyanine pigment in the preparation example 1 was replaced with a pigment yellow 74, to thereby obtain a yellow polymer fine particle dispersoid. Measured with the micro track UPA, the polymer fine particle showed an average particle diameter (D 50%) of 76 nm.

Coloring Agent

Preparation Example 4

Preparation of Carbon Black Dispersing Solution Subjected to Diazo Compound Treatment Carbon black 100 g (surface 230 $m^2$/g, DBP oil absorption 70 ml/100 g) and p-amino-N-benzoic acid 34 g were mixed and dispersed in water 750 g, then nitric acid 16 g was dropped therein, and then the mixture was stirred at 70° C. After 5 minutes, a solution of water 50 g with sodium nitrite 11 g dissolved therein was added. Another stirring for 1 hour. The thus obtained slurry was diluted to 10 times, and was subjected to a centrifugal treatment for removing coarse grains. pH was regulated to 8 to 9 with diethanol amine. An ultrafiltration was carried out for desalinization-enrichment, to thereby obtain a carbon black dispersing solution with its pigment density 15% by weight. The resultant was polypropylene-filtered (0.5 μm), to thereby obtain a carbon black dispersing solution 1. Measured with the micro track UPA, the carbon black dispersing solution 1 showed an average particle diameter (D 50%) of 99 nm.

Coloring Agent

Preparation Example 5

Preparation of Carbon Black Dispersing Solution Subjected to Hypochlorous Acid Treatment A commercially-available acid carbon black 300 g (Monarch 1300 made by Cabot Corporation) having pH 2.5 was sufficiently mixed with water 1000 milliliter, then a hypochlorous acid soda (effective chlorine density 12%) 450 g was dropped therein, and then stirred for 8 hours at 100° C. to 105° C. Another hypochlorous acid soda (effective chlorine density 12%) 100 g was added to the solution, followed by dispersion for 3 hours with a horizontal dispersing machine. The thus obtained slurry was diluted to 10 times with water, pH was regulated with lithium hydroxide, then an ultrafiltration was carried out for desalinization-enrichment to electric conductivity of 0.2 mS/cm, to thereby obtain a carbon black dispersing solution having pigment density of 15%. The thus obtained carbon black dispersing solution was subjected to a centrifugal treatment for removing coarse grains, and then subjected to a nylon filter of 1 micron, to thereby obtain a carbon black dispersing solution 2. Measured with the micro track UPA, the carbon black dispersing solution 2 showed an average particle diameter (D 50%) of 95 nm.

Ink a

An ink composition having the following prescription was prepared, and a lithium hydroxide 10% solution was used for regulating pH to 9. Then, a membrane filter having an average pore diameter of 0.8 μm was used for filtering, to thereby obtain an ink composition.

Coloring Agent

Preparation Example 4

| | |
|---|---|
| Carbon black dispersion solution 1 subjected to diazo compound treatment | 8.0% by weight (solid content) |
| 1,4-butanediol | 22.5% by weight |
| Glycerine | 7.5% by weight |
| N-methyl-2-pyrrolidone | 2.0% by weight |
| Surfactant of specific example (II-2) | 2.0% by weight |
| 2,2,4,-trimethyl-1,3-pentane diol | 2.0% by weight |
| PROXEL LV (preservative) | 0.2% by weight |
| Ion exchanged water | Balance |

Ink b

Preparation of the ink a was likewise carried out except that the following compositions were used, to thereby prepare an ink composition by regulating pH to 9 using lithium hydroxide.

Coloring Agent

Preparation Example 1

| | |
|---|---|
| Phthalocyanine pigment-contained polymer fine particle dispersoid | 15.0% by weight (solid content) |
| 1,5-pentanediol | 15.0% by weight |
| Glycerine | 15.0% by weight |
| N-hydroxy ethyl-2-pyrrolidone | 2.0% by weight |
| Surfactant of specific example (II-3) | 2.0% by weight |
| 2-ethyl-1,3-hexane diol | 2.0% by weight |
| PROXEL LV (preservative) | 0.2% by weight |
| Ion exchanged water | Balance |

Ink c

Preparation of the ink a was likewise carried out except that the following compositions were used, to thereby prepare an ink composition by regulating pH to 9 using lithium hydroxide.

Coloring Agent

Preparation Example 2

| | |
|---|---|
| Dimethyl quinacridone pigment-contained polymer fine particle dispersoid | 15.0% by weight (solid content) |
| 1,6-hexanediol | 22.5% by weight |
| Glycerine | 7.5% by weight |
| 2-pyrrolidone | 3.0% by weight |
| Surfactant of specific example (II-4) | 2.0% by weight |
| 2,2,4,-trimethyl-1,3-pentane diol | 2.0% by weight |
| PROXEL LV (preservative) | 0.2% by weight |
| Ion exchanged water | Balance |

Ink d

Preparation of the ink a was likewise carried out except that the following compositions were used, to thereby prepare an ink composition by regulating pH to 9 using lithium hydroxide.

Coloring Agent

Preparation Example 3

| | |
|---|---|
| Monoazo yellow pigment-contained polymer fine particle dispersoid | 15.0% by weight |
| 2-methyl-2,4-pentanediol | 22.5% by weight (solid content) |
| Glycerine | 7.5% by weight |
| N-methyl-2-pyrrolidone | 5.0% by weight |
| 2-pyrrolidone | 3.0% by weight |
| Surfactant of general formula (III) (R = n-hexyl group, k = 5) | 2.0% by weight |
| 2-ethyl-1,3-hexane diol | 2.0% by weight |
| 2,2,4,-trimethyl-1,3-pentane diol | 2.0% by weight |
| PROXEL LV (preservative) | 0.2% by weight |
| Ion exchanged water | Balance |

Ink e

An ink composition having the following prescription was prepared, and a lithium hydroxide 10% solution was used for regulating pH to 9. Then, a membrane filter having an average pore diameter of 0.8 μm was used for filtering, to thereby obtain an ink composition.

Coloring Agent

Preparation Example 1

| | |
|---|---|
| Phthalocyanine pigment-contained polymer fine particle dispersoid | 5.0% by weight (solid content) |
| Ethylene glycol | 15.0% by weight |
| Glycerine | 5.0% by weight |
| 2-pyrrolidone | 2.0% by weight |
| ECTD-3NEX (anionic surfactant made by Nikko Chemicals) | 1.0% by weight |
| 2-ethyl-1,3-hexanediol | 2.0% by weight |
| Acrylic resin emulsion | 3.0% by weight |
| PROXEL LV (preservative) | 0.2% by weight |
| Ion exchanged water | Balance |

Ink f

Preparation of the ink a was likewise carried out except that the following compositions were used, to thereby prepare an ink composition by regulating pH to 9 using lithium hydroxide.

Coloring Agent

Preparation Example 2

| | |
|---|---|
| Dimethyl quinacridone pigment-contained polymer fine particle dispersoid | 6.0% by weight (solid content) |
| Diethylene glycol | 15.0% by weight |
| Glycerol | 5.0% by weight |
| N-methyl-2-pyrrolidone | 2.0% by weight |
| ECTD-6NEX (anionic surfactant made by Nikko Chemicals) | 1.0% by weight |
| 2,2,4-trimethyl-1,3-pentane diol | 2.0% by weight |
| PROXEL LV (preservative) | 0.2% by weight |
| Ion exchanged water | Balance |

Ink g

Preparation of the ink a was likewise carried out except that the following compositions were used, to thereby prepare an ink composition by regulating pH to 9 using lithium hydroxide.

Coloring Agent

Preparation Example 3

| | |
|---|---|
| Monoazo yellow pigment-contained polymer fine particle dispersoid | 5.0% by weight (solid content) |
| Triethylene glycol | 15.0% by weight |
| Glycerin | 5.0% by weight |
| N-hydroxy ethyl-2-pyrrolidone | 2.0% by weight |
| Surfactant expressed by general formula (IV) (R = $C_{13}H_{27}$, n = 8) | 1.0% by weight |
| 2-ethyl-1,3-hexane diol | 2.0% by weight |
| Acrylic rein emulsion | 3.0% by weight |
| PROXEL LV (preservative) | 0.2% by weight |
| Ion exchanged water | Balance |

Ink h

Preparation of the ink a was likewise carried out except that the following compositions were used, to thereby prepare an ink composition by regulating pH to 9 using lithium hydroxide.

Coloring Agent

Preparation Example 4

| | |
|---|---|
| Carbon black dispersoid subjected to diazo compound treatment | 4.0% by weight (solid content) |
| Ethylene glycol | 15.0% by weight |
| Glycerine | 2.0% by weight |
| 2-pyrrolidone | 2.0% by weight |
| ECTD-6NEX (Anionic surfactant made by Nikko Chemicals) | 1.0% by weight |
| 2,2,4-trimethyl-1,3-pentanediol | 2.0% by weight |
| PROXEL LV (preservative) | 0.2% by weight |
| Ion exchanged water | Balance |

Ink i

Preparation of the ink a was likewise carried out except that the following compositions were used, to thereby prepare an ink composition by regulating pH to 9 using lithium hydroxide.

Coloring Agent

Preparation Example 5

| | |
|---|---|
| Carbon black dispersoid 2 subjected to hypochlorous acid treatment | 8.0% by weight (solid content) |
| Acrylic resin emulsion | 3.0% by weight (solid content) |
| Triethylene glycol | 15.0% by weight |
| Glycerol | 10.0% by weight |
| 2-hydroxy ethyl pyrrolidone | 5.0% by weight |
| Surfactant of specific example (I-2) | 1.0% by weight |
| 2-ethyl-1,3-hexane diol | 1.0% by weight |
| Sodium dehydroacetate | 0.2% by weight |
| Ion exchanged water | Balance |

Table 3-1 to Table 3-3 show i) coloring agent solid content density (pigment and emulsion), ii) wetting agent density and ink viscosity of the compositions of the ink a to the ink i.

TABLE 3-1

| | | Coloring agent solid content density (% by weight) | Wetting agent density (% by weight) | Viscosity mPa · sec (25° C.) |
|---|---|---|---|---|
| Ink set A | Ink b CYAN | 15.0 | 30.0 | 9.3 |
| | Ink c MAG | 15.0 | 30.0 | 10.3 |
| | Ink d YEL | 15.0 | 30.0 | 9.6 |
| | Ink a Bk (self-dispersion) | 8.0 | 30.0 | 8.0 |

TABLE 3-2

| | | Coloring agent solid content density (% by weight) | Wetting agent density (% by weight) | Viscosity mPa · sec (25° C.) |
|---|---|---|---|---|
| Ink set B | Ink e CYAN | 5.0 | 20.0 | 2.6 |
| | Ink f MAG | 6.0 | 20.0 | 2.9 |
| | Ink g YEL | 5.0 | 20.0 | 2.8 |
| | Ink h Bk (self-dispersion) | 4.0 | 20.0 | 3.2 |

TABLE 3-3

|  |  | Coloring agent solid content density (% by weight) | Wetting agent density (% by weight) | Viscosity mPa·sec (25° C.) |
|---|---|---|---|---|
| Ink set C | Ink b CYAN | 15.0 | 30.0 | 9.3 |
|  | Ink c MAG | 15.0 | 30.0 | 10.3 |
|  | Ink d YEL | 15.0 | 30.0 | 9.6 |
|  | Ink i Bk (self-dispersion + emulsion) | 11.0 | 30.0 | 9.3 |

Explanation of Recording Medium
Recording Medium 1 (OHP Sheet)

Alumina sol 100 g (18% by weight, solid content) synthesized by hydrolysis-peptisation of aluminum alkoxide was mixed with polyvinyl alcohol 6.2% by weight solution 32 g, to thereby prepare a coating solution. The coating solution was applied on to a polyethylene terephthalate film (thickness 100 μm, white) using a bar coater in such a manner as to obtain application amount after drying of 26 g/m², followed by drying, to thereby form a pseudo-boehmite layer. Then, a silica sol coating solution made from i) a silica sol having a primary particle diameter 10 nm to 20 nm and ii) a polyvinyl alcohol copolymer (branded as R-polymer-R-1130 made by KURARAY CO., LTD.) having silanol group was applied in such a manner as to have a silica gel layer thickness after drying of 1 μm, followed by drying, followed by heat treatment at 140° C., to thereby obtain an OHP sheet.

Recording Medium 2 (Gloss Paper)

On both sides of a base paper sheet having basis weight 83 g/m² and smoothness 200 second, a polyethylene resin coat layer (surface side thereof contains i. anatase titanium dioxide pigment subjected to surface treatment, and ii. zinc stearate) was coated (melting-extruding), to thereby prepare a resin coat paper support for an inkjet record sheet. A resin face on a surface side of the resin coat paper support was subjected to a corona discharge. Then, an inkjet accepting layer coating solution composed of i) 5% solution 16.6% by weight of polyvinyl alcohol (saponification 98.5 mol %, average polymerization 1700), a mixture (2%, 1% by weight) of methanol (of sulfosuccinate-2-ethyl hexyl ester salt) and water, colloidal silica of drying weight 4.5% by weight (with a needle colloidal silica as a base, a silica (SiO₂ conversion) was cationically modified using about 6.2% by weight aluminum hydroxide at Al₂O₃ conversion, to thereby prepare a needle colloidal silica (made by Nissan Chemical Industries, Ltd.)), and iv) pure water of remaining % by weight was applied with a coater in such a manner as to have dry weight 10 g/m², followed by drying, to thereby obtain an inkjet gloss paper sheet.

Recording Medium 3 (Plain Paper)
"My paper" (plain paper for electrophotography; made by NBS Ricoh)
Recording Medium 4 (Mat Coat Paper)
"Image chroma mat finishing (super fine grade" (Inkjet Paper; made by Fuji Photo Film Co., Ltd.)

Then, using the above recording mediums and the ink a to the ink i, the following tests were carried out using the ink set A, the ink set B and the ink set C composed of cyan, magenta, yellow and black, as is seen in Table 3-1, Table 3-2 and Table 3-3.

A modified ink-jet printer EM-900C (made by Seiko Epson Corporation) was used for printing on each recording medium by varying the head's driving voltage, frequency and pulse width. Printing patters were categorized into i) single color solid pattern of C, M and Y, ii) double solid pattern of B, G and R, and iii) solid pattern of K. The solid patterns of K were categorized into i) black ink (one color) when black ink is used, and ii) cyan, magenta and yellow (three colors) when black is not used. Moreover, an ink for the solid printing was likewise used for the character printing. Printing conditions: Mj 35 pl, Vj 20 m/sec, frequency 1 kHz, recording density 720 dpi, and one pass printing. The ink's total amount controlling value (denoted by ink's weight per unit area): 22 g/m² for OHP sheet, 20 g/m² for gloss paper, 17 g/m² for plain paper, and 25 g/m² for mat coat paper.

After the printing-drying, the image density (C, M, Y, K) and the friction resistance (K) were evaluated. On the gloss paper, the gloss feeling of the image was evaluated.

In terms of the image density: Reflection density of the gloss paper, the plain paper, and the mat coat paper was measured with X-Rite938, while a transparent density of the OHP sheet was measured with X-Rite910T.

By making five reciprocations of the K image part with a clock meter to which a line cloth is attached, the friction resistance was determined referring to colored degree of the line cloth, based on the following criteria.

Results are shown in Table 4-1, Table 4-2, Table 4-3 and Table 4-4; and Table 5-1, Table 5-2, Table 5-3 and Table 5-4, where C denotes cyan, M denotes magenta, Y denotes yellow and K denotes black.

(Criteria)
Friction Resistance
A: Line cloth is scarcely colored.
B: Line cloth is slightly colored.
C: Line cloth is obviously colored.
D: Line cloth is densely colored.
(Image Gloss Feeling)
The gloss paper was subjected to the visual inspection of the image gloss.
A: Excellent
B: Good
C: Slightly deteriorated
D: Deteriorated

TABLE 4-1

| Recording medium | Ink set | Mode | Ink used | Image density | Friction resistance | Image gloss |  |
|---|---|---|---|---|---|---|---|
| Recording medium 1 (OHP sheet) | Ink set A | Color mode | Three colors (CMY) | C: 1.81, M: 1.34 Y: 1.06, K: 1.28 | B | — | Present invention |
|  |  |  | Four colors (CMYK) | C: 1.82, M: 1.32 Y: 1.04, K: 1.34 | D | — | Comparative example |
|  |  | Monochrome mode | Three colors (CMY) | K: 1.27 | B | — | Present invention |
|  |  |  | One color (K) | K: 1.33 | D | — | Comparative example |

TABLE 4-2

| Recording medium | Ink set | Mode | Ink used | Image density | Friction resistance | Image gloss | |
|---|---|---|---|---|---|---|---|
| Recording medium 2 (gloss paper) | Ink set A | Color mode | Three colors (CMY) | C: 2.15, M: 1.73 Y: 1.45, K: 1.85 | B | B | Present invention |
| | | | Four colors (CMYK) | C: 2.13, M: 1.72 Y: 1.45, K: 1.90 | D | D | Comparative example |
| | | Monochrome mode | Three colors (CMY) | K: 1.86 | B | B | Present invention |
| | | | One color (K) | K: 1.92 | D | D | Comparative example |

TABLE 4-3

| Recording medium | Ink set | Mode | Ink used | Image density | Friction resistance | Image gloss | |
|---|---|---|---|---|---|---|---|
| Recording medium 3 (plain paper) | Ink set A | Color mode | Four colors (CMYK) | C: 1.33, M: 1.28 Y: 1.22, K: 1.42 | B | — | Present invention |
| | | Monochrome mode | One color (K) | K: 1.46 | B | — | Present invention |
| | Ink set B | Color mode | Four colors (CMYK) | C: 1.01, M: 0.98 Y: 0.89, K: 1.10 | B | — | Present invention |
| | | Monochrome mode | One color (K) | K: 1.08 | B | — | Present invention |

TABLE 4-4

| Recording medium | Ink set | Mode | Ink used | Image density | Friction resistance | Image gloss | |
|---|---|---|---|---|---|---|---|
| Recording medium 4 (mat coat paper) | Ink set A | Color mode | Four colors (CMYK) | C: 1.50, M: 1.45 Y: 1.11, K: 1.54 | B | — | Present invention |
| | | Monochrome mode | One color (K) | K: 1.55 | B | — | Present invention |

TABLE 5-1

| Recording medium | Ink set | Mode | Ink used | Image density | Friction resistance | Image gloss | |
|---|---|---|---|---|---|---|---|
| Recording medium 1 (OHP sheet) | Ink set C | Color mode | Four colors (CMYK) | C: 1.81, M: 1.34 Y: 1.06, K: 1.34 | B | — | Present invention |
| | | Monochrome mode | One color (K) | K: 1.34 | B | — | Present invention |
| | | | Four colors (CMYK) | K: 1.33 | B | — | Present invention |

TABLE 5-2

| Recording medium | Ink set | Mode | Ink used | Image density | Friction resistance | Image gloss | |
|---|---|---|---|---|---|---|---|
| Recording medium 2 (gloss paper) | Ink set C | Color mode | Four colors (CMYK) | C: 2.15, M: 1.73 Y: 1.45, K: 1.90 | B | B | Present invention |
| | | Monochrome mode | One color (K) | K: 1.92 | B | B | Present invention |
| | | | Four colors (CMYK) | K: 1.89 | B | B | Present invention |

TABLE 5-3

| Recording medium | Ink set | Mode | Ink used | Image density | Friction resistance | Image gloss | |
|---|---|---|---|---|---|---|---|
| Recording medium 3 (plain paper) | Ink set C | Color mode | Four colors (CMYK) | C: 1.33, M: 1.28 Y: 1.22, K: 1.42 | B | — | Present invention |
| | | Monochrome mode | One color (K) | K: 1.46 | B | — | Present invention |
| | | | Four colors (CMYK) | K: 1.44 | B | — | Present invention |

TABLE 5-4

| Recording medium | Ink set | Mode | Ink used | Image density | Friction resistance | Image gloss | |
|---|---|---|---|---|---|---|---|
| Recording medium 4 (mat coat paper) | Ink set C | Color mode | Four colors (CMYK) | C: 1.50, M: 1.45 Y: 1.11, K: 1.55 | B | — | Present invention |
| | | Monochrome mode | One color (K) | K: 1.57 | B | — | Present invention |
| | | | Four colors (CMYK) | K: 1.54 | B | — | Present invention |

The ink's total control value more than the above values caused bleeding to two-color boundary, and caused boldness to two-color character and three-color character.

The present invention selecting the type of inks according to the type of recording medium and the printing mode can record a high-grade image.

Effecting the feature of an ink containing i) a black ink containing a self-dispersion carbon black which is higher in density and lower in surface tension than the conventional ink and ii) a color ink containing colored polymer fine particle, the present invention can record a high-grade image having high printing density, capable of forming a sharp image and excellent in rigidity (waterproof, light proof, friction resistance and the like).

Moreover, controlling the ink's total amount of the color-overlapped part can record the image with improved image quality in terms of gradation.

What is claimed is:

1. An inkjet recording apparatus, comprising:
a black ink ejecting portion configured to eject a black ink containing a self-dispersion pigment;
color ink ejecting portions configured to eject, respectively, as color inks, a cyan ink, a magenta ink and a yellow ink which each comprise a polymer emulsion which comprises a polymer fine particle containing a coloring material which is insoluble in water or slightly soluble in water; and
a recording-controlling unit configured to control recording,
wherein the black ink ejecting portion and the color ink ejecting portions scan relative to a recording medium, to thereby record an image on the recording medium,
wherein, when the recording is carried out on the recording medium in the following cases:
(i) the recording medium is optically transparent and is provided, on a transparent base material thereof, with an ink accepting layer, and
(ii) the recording medium is provided, on an opaque base material thereof, with an ink accepting layer which has a surface having a gloss,
the recording-controlling unit controls recording on the recording medium such that the color inks are used for recording a monochrome image and a color image which has a plurality of colors, leaving the black ink substantially free from being used,
wherein, when a black color area in the color image is recorded in the following cases:
(iii) the color image is recorded on a plain paper sheet, and
(iv) the color image is recorded on the recording medium which is provided, on an opaque base material thereof, with an ink accepting layer which has a surface free from a gloss,
the recording-controlling unit controls recording such that the black ink and the color inks are used in combination, and
wherein, in the following cases:
(v) recording the monochrome image on the plain paper sheet, and
(vi) recording the monochrome image on the recording medium which is provided, on the opaque base material thereof, with the ink accepting layer which has the surface free from the gloss,
the recording-controlling unit controls recording such that the black ink is used, leaving the color inks substantially free from being used.

2. The inkjet recording apparatus according to claim 1, wherein a density of the ink is 5 mPa·sec or more at 25° C.

3. The inkjet recording apparatus according to claim 1, wherein the color inks each comprise:
the polymer emulsion which comprises the polymer fine particle containing the coloring material which is insoluble in water or slightly soluble in water;
at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

4. The inkjet recording apparatus according to claim 1, wherein the black ink comprises:
the self-dispersion pigment;
at least one wetting agent selected from the group consisting of glycerin, 1,3-butanediol, triethylene glycol, 1,6- hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

5. The inkjet recording apparatus according to claim 2, wherein the color inks each comprise:
the polymer emulsion which comprises the polymer fine particle containing the coloring material which is insoluble in water or slightly soluble in water;
at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

6. The inkjet recording apparatus according to claim 2, wherein the black ink comprises:
the self-dispersion pigment;
at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

7. The inkjet recording apparatus according to claim 3, wherein the black ink comprises:
the self-dispersion pigment;
at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

8. The inkjet recording apparatus according to claim 5, wherein the black ink comprises:
the self-dispersion pigment;
at least one wetting agent selected from the group consisting of glycerin, 1,3-butanediol, triethylene glycol, 1,6-hexanediol, propylene glycol, 1,5-pentanediol, diethylene glycol, dipropylene glycol, trimethylol propane, and trimethylol ethane;
at least one of a polyol having 8 to 11 carbon atoms, and a glycol ether having 8 to 11 carbon atoms;
one of an anionic surfactant and a nonionic surfactant;
a water-soluble organic solvent; and
water.

* * * * *